(12) United States Patent
Ishii et al.

(10) Patent No.: US 12,391,305 B2
(45) Date of Patent: Aug. 19, 2025

(54) TORQUE TRANSFER JOINT AND ELECTRIC MOTOR WITH WORM REDUCTION GEAR

(71) Applicant: NSK LTD., Tokyo (JP)

(72) Inventors: Toru Ishii, Maebashi (JP); Toru Segawa, Maebashi (JP); Ryo Osawa, Maebashi (JP); Yuki Uchiyama, Maebashi (JP)

(73) Assignee: NSK LTD., Tokyo (JP)

(*) Notice: Subject to any disclaimer, the term of this patent is extended or adjusted under 35 U.S.C. 154(b) by 726 days.

(21) Appl. No.: 17/782,377

(22) PCT Filed: Dec. 2, 2020

(86) PCT No.: PCT/JP2020/044945
§ 371 (c)(1),
(2) Date: Jun. 3, 2022

(87) PCT Pub. No.: WO2021/112153
PCT Pub. Date: Jun. 10, 2021

(65) Prior Publication Data
US 2023/0024110 A1   Jan. 26, 2023

(30) Foreign Application Priority Data

Dec. 4, 2019   (JP) .................... 2019-219337

(51) Int. Cl.
*B62D 5/04*  (2006.01)
*B62D 7/16*  (2006.01)
(Continued)

(52) U.S. Cl.
CPC ........ *B62D 5/0454* (2013.01); *B62D 5/0409* (2013.01); *B62D 7/16* (2013.01); *F16D 3/68* (2013.01); *F16D 3/12* (2013.01)

(58) Field of Classification Search
CPC ...... B62D 5/0454; B62D 5/0409; B62D 7/16; F16D 3/68; F16D 3/12
See application file for complete search history.

(56) References Cited

U.S. PATENT DOCUMENTS 6,183,368 B1 *  2/2001  King .................. F16D 3/74
                                                464/60
2015/0252854 A1   9/2015  Hakamata
(Continued)

FOREIGN PATENT DOCUMENTS

| CN | 104144842 A | * 11/2014 | ........ B62D 5/0403 |
| JP | 2004-306898 A | 11/2004 | |

(Continued)

OTHER PUBLICATIONS

International Search Report dated Feb. 2, 2021 issued by the International Searching Authority in counterpart International Application No. PCT/JP2020/044945 (PCT/ISA/210).
(Continued)

*Primary Examiner* — Jacob D Knutson
(74) *Attorney, Agent, or Firm* — Sughrue Mion, PLLC

(57) ABSTRACT

A torque transmission joint includes a first elastic body having a plurality of first elastic pieces pinched in a circumferential direction between respective first convex portions and a coupling, and a second elastic body having a plurality of second elastic pieces pinched in the circumferential direction between respective second convex portions and the coupling.

10 Claims, 17 Drawing Sheets

(51) Int. Cl.
    *F16D 3/68*     (2006.01)
    *F16D 3/12*     (2006.01)

(56) References Cited

U.S. PATENT DOCUMENTS

| | | |
|---|---|---|
| 2015/0329139 A1 | 11/2015 | Kakutani et al. |
| 2019/0264751 A1* | 8/2019 | Oosawa .................. F16D 3/68 |

FOREIGN PATENT DOCUMENTS

| | | | |
|---|---|---|---|
| JP | 2013228061 A | * | 11/2013 |
| JP | 2015-81669 A | | 4/2015 |
| JP | 2015081669 A | * | 4/2015 |
| JP | 2015-169225 A | | 9/2015 |
| JP | 2015-217704 A | | 12/2015 |
| WO | 2018/216233 A1 | | 11/2018 |
| WO | 2019/049389 A1 | | 3/2019 |

OTHER PUBLICATIONS

International Written Opinion dated Feb. 2, 2021 issued by the International Searching Authority in counterpart International Application No. PCT/JP2020/044945 (PCT/ISA/237).

\* cited by examiner

AXIAL OTHER SIDE ← → AXIAL ONE SIDE

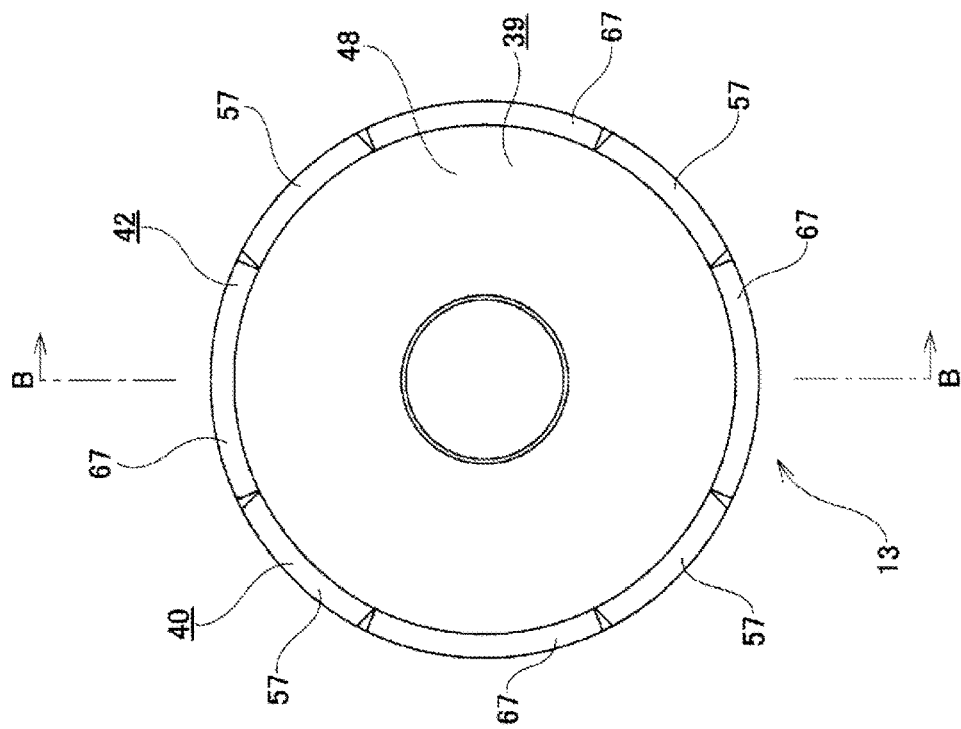
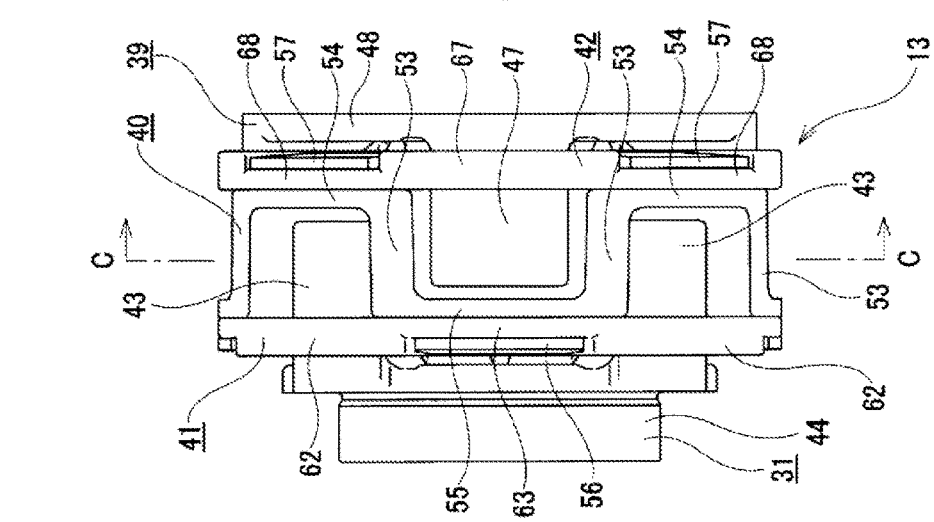
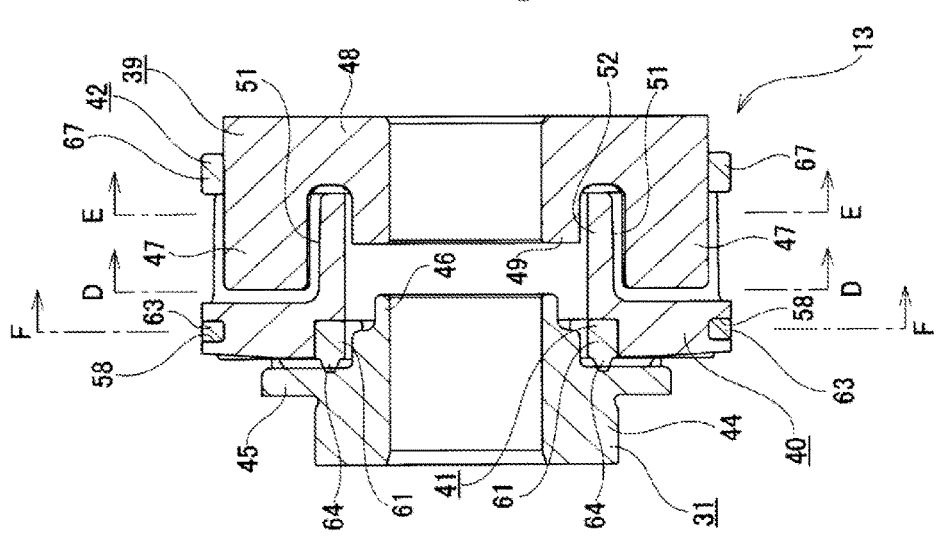

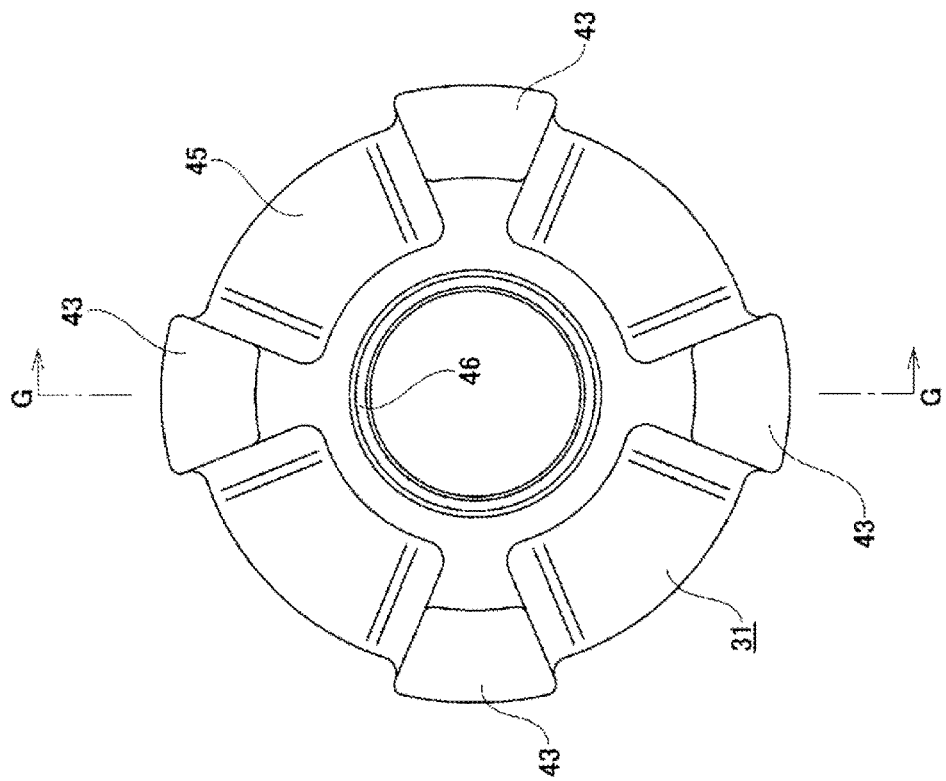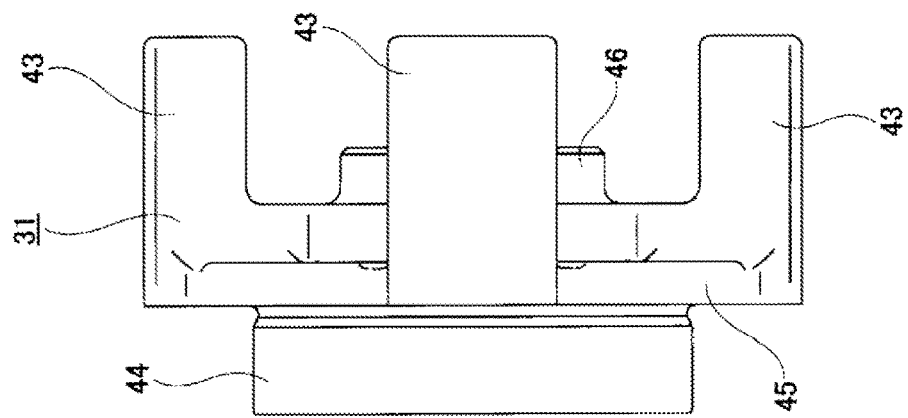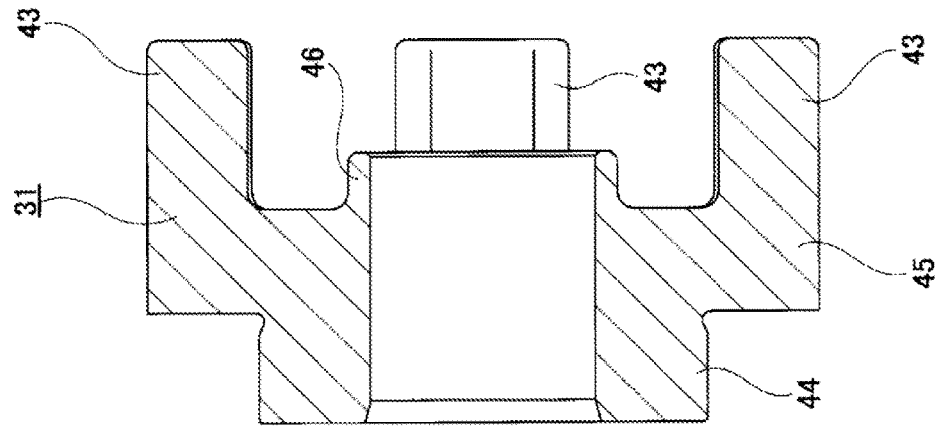

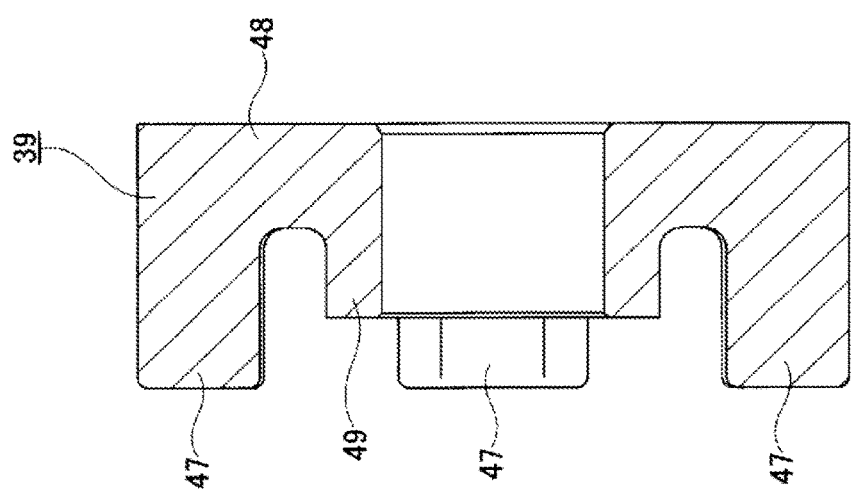
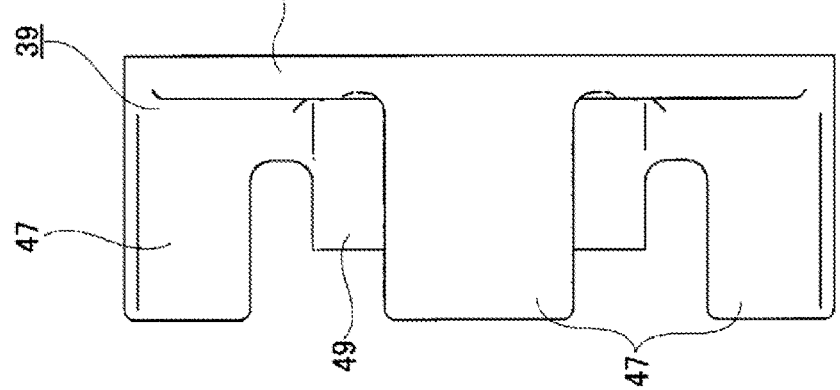
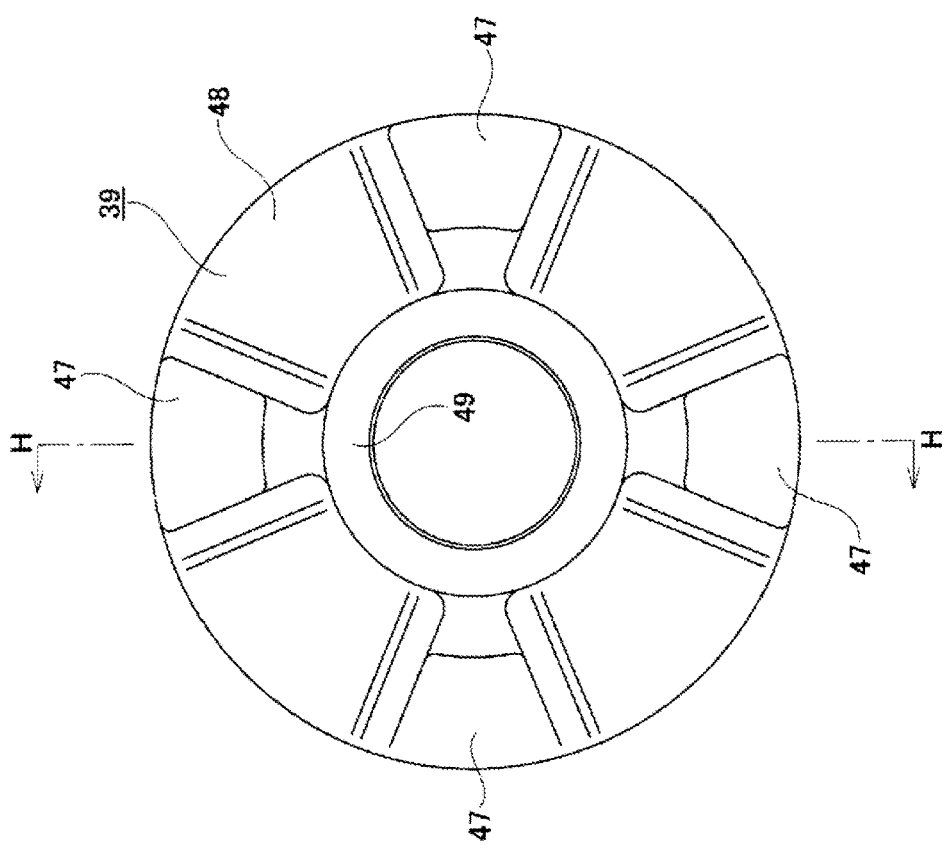

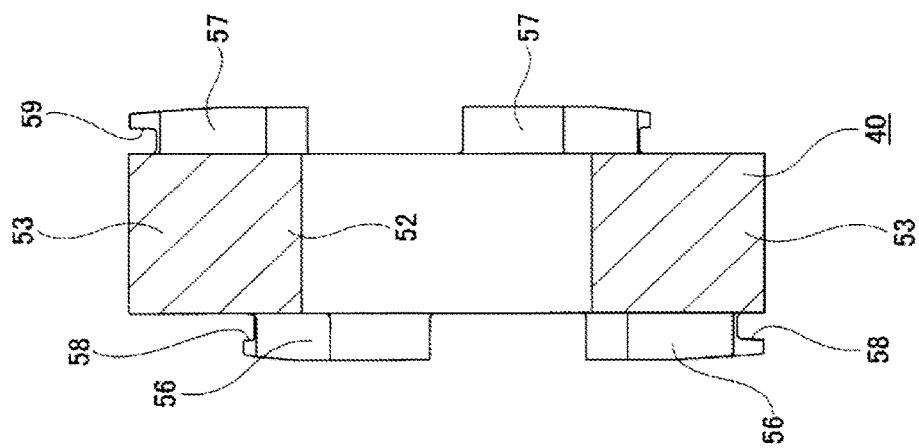
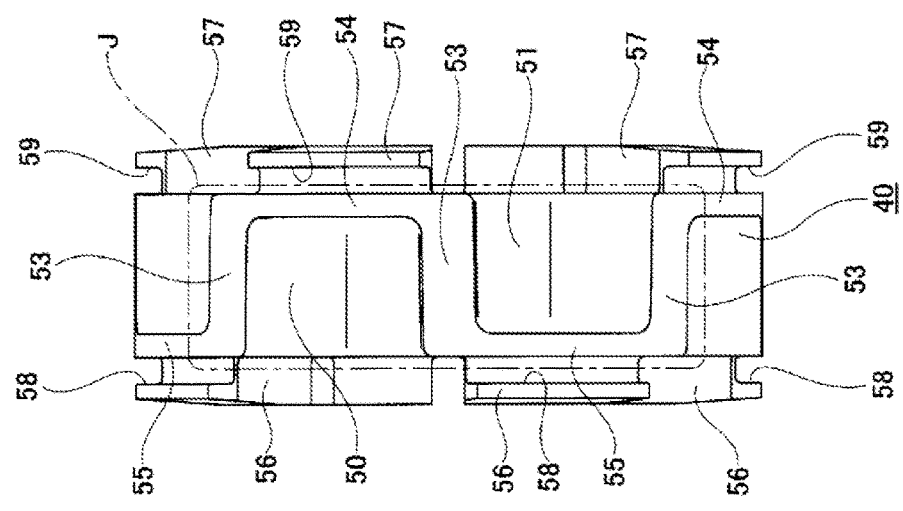
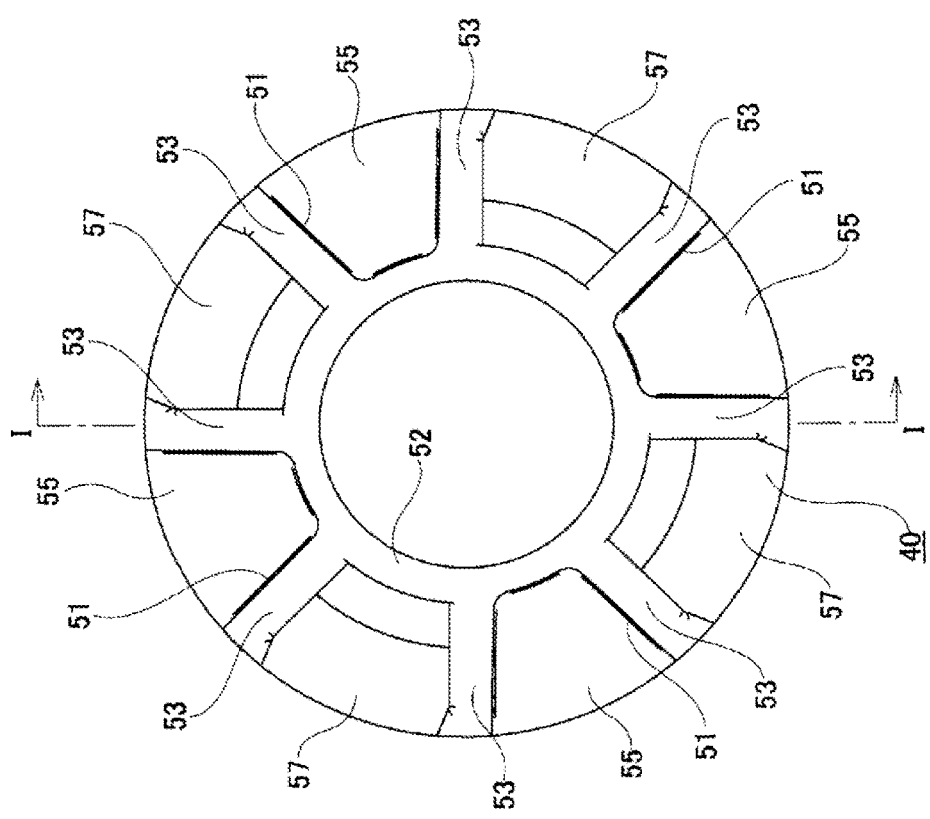

TORQUE TRANSFER JOINT AND ELECTRIC MOTOR WITH WORM REDUCTION GEAR

CROSS-REFERENCE TO RELATED APPLICATIONS

This application is a National Stage of International Application No. PCT/JP2020/044945 filed Dec. 2, 2020, claiming priority based on Japanese Patent Application No. 2019-219337, filed Dec. 4, 2019, the contents of all of which are incorporated herein by reference in their entirety.

TECHNICAL FIELD

The present invention relates to a torque transmission joint incorporated into various mechanical devices and used to transmit torque between a pair of rotating members, and a worm reducer-attached electric motor including the torque transmission joint.

BACKGROUND ART

A power steering device is widely used because the power steering device can reduce force required for a driver to operate a steering wheel. There are two types of power steering devices: an electric power steering device which uses an electric motor as an auxiliary power source, and a hydraulic power steering device which uses hydraulic pressure as an auxiliary power source. Of these, the electric power steering device has advantages of being smaller and lighter than the hydraulic power steering device, being easy to control an amount of the auxiliary power, having less power loss of an engine, and the like, and thus the electric power steering device is used more frequently.

In the electric power steering device, the auxiliary power of the electric motor is applied to a rotation shaft for steering which rotates based on an operation of the steering wheel via a reducer. As a reducer, a worm reducer is widely used because a large reduction ratio and the like can be obtained. However, since there is an unavoidable backlash in a meshing portion between a worm wheel and a worm which compose the worm reducer, there is a problem that it is easy to generate a rattling noise when a rotation direction of the worm wheel changes.

In JP-A-2004-306898 (Patent Document 1), a structure is disclosed in which an urging member including a spring between a bearing placed on a tip side of a worm, which one of a pair of bearings for rotatably supporting the worm with respect to a housing, and the housing, and a tip portion of the worm is urged toward a worm wheel. According to such a structure, backlash of a meshing portion can be suppressed, and the generation of rattling noise at the meshing portion between the worm wheel and the worm can be suppressed.

PRIOR ART DOCUMENT

Patent Document

Patent Document 1: JP-A-2004-306898

SUMMARY OF INVENTION

Technical Problem

In the structure described in JP-A-2004-306898, by spline-engaging a spline shaft portion provided at a tip portion of an output shaft of an electric motor and a spline hole provided at a base end portion of the worm, the output shaft and the worm are connected to allow torque transmission. When the spline shaft portion and the spline hole are spline-engaged without any circumferential clearance (without backlash), no abnormal noise is generated at a connection portion (spline engagement portion) between the output shaft and the worm. However, in the structure described in JP-A-2004-306898, since it is necessary for the worm to be oscillated and displaced in order to urge the tip portion of the worm toward the worm wheel by the urging member, backlash at the spline engagement portion cannot be completely eliminated. Therefore, there is room for improvement in order to suppress the generation of abnormal noise.

The present invention is made in view of the circumstances described above, and an object thereof is to realize a structure of a torque transmission joint which can smoothly transmit torque between a pair of rotating members and prevent generation of abnormal noise between the pair of rotating members even when central axes of the pair of rotating members do not match each other.

Solution to Problem

A torque transmission joint of the present invention includes:
- a first rotating member having first convex portions protruding toward axial one side at a plurality of locations in a circumferential direction on an axial one side surface;
- a second rotating member having second convex portions protruding toward axial other side at a plurality of locations in the circumferential direction on an axial other side surface;
- a coupling having first recess portions which are opened at least on the axial other side surface and with which the first convex portions are respectively engaged to allow relative displacement in the circumferential direction at a plurality of locations in the circumferential direction and second recess portions which are opened at least on the axial one side surface and with which the second convex portions are respectively engaged to allow relative displacement in the circumferential direction at a plurality of locations in the circumferential direction which deviate from the first recess portions in the circumferential direction;
- a first elastic body having a plurality of first elastic pieces pinched in the circumferential direction between the respective first convex portions and the coupling; and
- a second elastic body having a plurality of second elastic pieces pinched in the circumferential direction between the respective second convex portions and the coupling.

The coupling may include,
a boss portion having a cylindrical or columnar shape,
a plurality of arm portions protruding outward in a radial direction from a plurality of circumferential locations on an outer peripheral surface of the boss portion,
a plurality of first side plate portions which protrude outward in the radial direction from a plurality of circumferential locations on an outer peripheral surface of an axial one side end of the boss portion and connect axial one side ends of a pair of the arm portions adjacent in the circumferential direction in the circumferential direction, and
a plurality of second side plate portions which protrude outward in the radial direction from a plurality of circumferential locations deviating from the first side plate portions in the circumferential direction of an outer peripheral surface of an axial other side end of the boss portion and connect axial other side ends of a pair of the arm portions adjacent in the circumferential direction in the circumferential direction.

In this case, each of the first recess portions is defined by an outer peripheral surface of the boss portion, an axial other side surface of each of the first side plate portions, and circumferential side surfaces of a pair of the arm portions facing each other with axial one side ends connected to each of the first side plate portions, and each of the second recess portions is defined by the outer peripheral surface of the boss portion, an axial one side surface of each of the second side plate portions, and circumferential side surfaces of a pair of the arm portions facing each other with axial other side ends connected to each of the second side plate portions.

The coupling may have a first support portion for supporting the first elastic body on an axial other side surface of each of the second side plate portions and have a second support portion for supporting the second elastic body on an axial one side surface of each of the first side plate portions.

The first elastic body may further include a plurality of first inner diameter side connection pieces and a plurality of first outer diameter side connection pieces which are arranged alternately in the circumferential direction, and first locking pieces. In this case, the first inner diameter side connection piece connects radial inner ends of a pair of the first elastic pieces adjacent in the circumferential direction, and the first outer diameter side connection piece connects radial outer ends of a pair of the first elastic pieces adjacent in the circumferential direction, and the first locking piece connects radial outer connection portions of a pair of the first elastic pieces with the radial inner ends connected by the first inner diameter side connection piece. The first elastic body is supported by the coupling by fitting a first supported portion formed of a pair of the first elastic pieces adjacent in the circumferential direction, the first inner diameter side connection piece, and the first locking piece onto the first support portion. The second elastic body may further include a plurality of second inner diameter side connection pieces and a plurality of second outer diameter side connection pieces which are arranged alternately in the circumferential direction, and second locking pieces. In this case, the second inner diameter side connection piece connects radial inner ends of a pair of the second elastic pieces adjacent in the circumferential direction, and the second outer diameter side connection piece connects radial outer ends of a pair of the second elastic pieces adjacent in the circumferential direction, and the second locking piece connects radial outer ends of a pair of the second elastic pieces with the radial inner ends connected by the second inner diameter side connection piece. The second elastic body is supported by the coupling by fitting a second supported portion formed of a pair of the second elastic pieces adjacent in the circumferential direction, the second inner diameter side connection piece, and the second locking piece onto the second support portion.

The coupling may have a first locking groove extending circumferentially on a radial outer surface of the first support portion to lock the first locking piece, and have a second locking groove extending circumferentially on a radial outer surface of the second support portion to lock the second locking piece.

The first recess portion may have a larger circumferential width dimension between axial other side portions of inner surfaces facing each other in the circumferential direction than a circumferential width dimension between axial one side portions, and the second recess portion may have a larger circumferential width dimension between axial one side portions of inner surfaces facing each other in the circumferential direction than a circumferential width dimension between axial other side portions.

In a state where the first elastic piece is elastically crushed in the circumferential direction and a circumferential inner surface of the first recess portion abuts on a circumferential outer surface of the first convex portion, and the second elastic piece is elastically crushed in the circumferential direction and a circumferential inner surface of the second recess portion abuts on a circumferential outer surface of the second convex portion, it is preferable that an axial other side portion of a portion abutting on a circumferential outer surface of the first convex portion of a circumferential inner surface of the first recess portion and an axial one side portion of a portion abutting on a circumferential outer surface of the second convex portion of a circumferential inner surface of the second recess portion overlap in the circumferential direction.

The first elastic body may have a plurality of first protrusions protruding toward the axial other side on an axial other side surface, and the second elastic body may have a plurality of second protrusions protruding toward the axial one side on an axial one side surface.

When the coupling is not tilted with respect to the axial direction, the plurality of first protrusions are not brought into contact with an axial one side surface of the first rotating member and the plurality of second protrusions are not brought into contact with an axial other side surface of the second rotating member.

When the coupling is tilted with respect to the axial direction, the plurality of first protrusions are brought into contact with the axial one side surface of the first rotating member and the plurality of second protrusions are brought into contact with the axial other side surface of the second rotating member.

It is preferable that the first elastic body and the second elastic body have the same shape and dimensions, and be made of the same material.

A worm reducer-attached electric motor of the present invention includes,
a worm wheel having a wheel tooth on an outer peripheral surface,
a worm having a worm tooth which meshes with the wheel tooth on an outer peripheral surface,
an electric motor which has an output shaft, and
a torque transmission joint which connects the output shaft and the worm so as to allow torque transmission.

In particular, in the worm reducer-attached electric motor of the present invention, the torque transmission joint is composed of the torque transmission joint of the present invention,
the first rotating member is composed of the worm or is supported and fixed to the worm, and
the second rotating member is composed of the output shaft or is supported and fixed to the output shaft.

Advantageous Effects of Invention

According to the torque transmission joint of the present invention, even when central axes of a pair of rotating members do not match each other, torque can be smoothly transmitted between the pair of rotating members, and abnormal noise can be prevented from being generated between the pair of rotating members.

BRIEF DESCRIPTION OF DRAWINGS

FIG. 3A is an end view illustrating a torque transmission joint of an example according to the embodiment of the present invention, FIG. 3B is a side view seen from the left side of FIG. 3A, and FIG. 3C is a cross-sectional view taken along the line B-B of FIG. 3A.

FIG. 10A is an end view illustrating a first rotating member, FIG. 10B is a side view seen from the left side of FIG. 10A, and FIG. 10C is a cross-sectional view taken along the line G-G of FIG. 10A.

FIG. 11A is an end view illustrating the second rotating member, FIG. 11B is a side view seen from the right side of FIG. 11A, and FIG. 11C is a cross-sectional view taken along the line H-H of FIG. 11A.

FIG. 12A is an end view illustrating a coupling, FIG. 12B is a side view seen from the right side of FIG. 12A, and FIG. 12C is a cross-sectional view taken along the line I-I of FIG. 12A.

DESCRIPTION OF EMBODIMENT

Example of Embodiment

Figure 1:
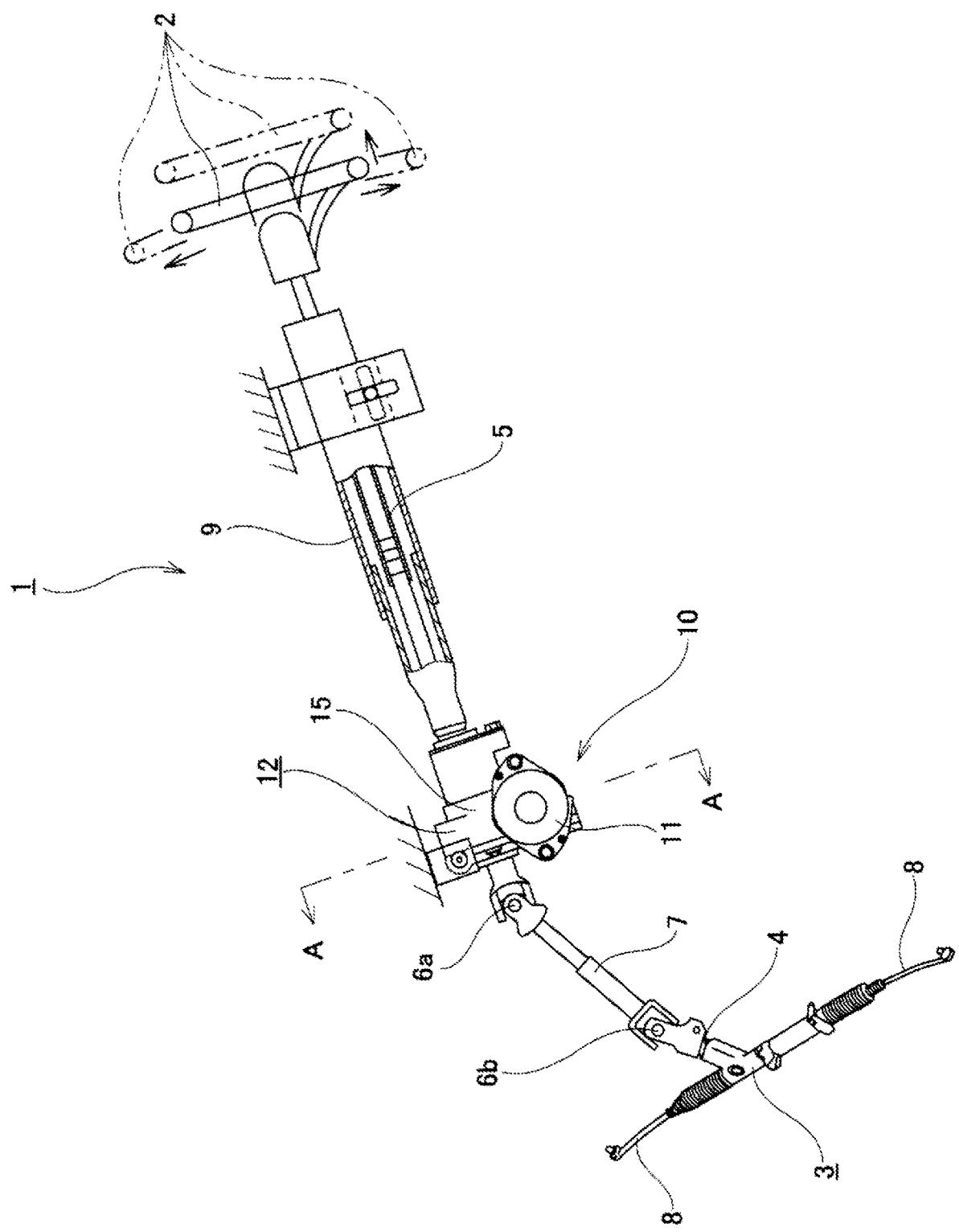
FIG. 1 is a partially cut side view illustrating an example of an electric power steering device including a worm reducer-attached electric motor of an example according to an embodiment of the present invention.
Figure 2:
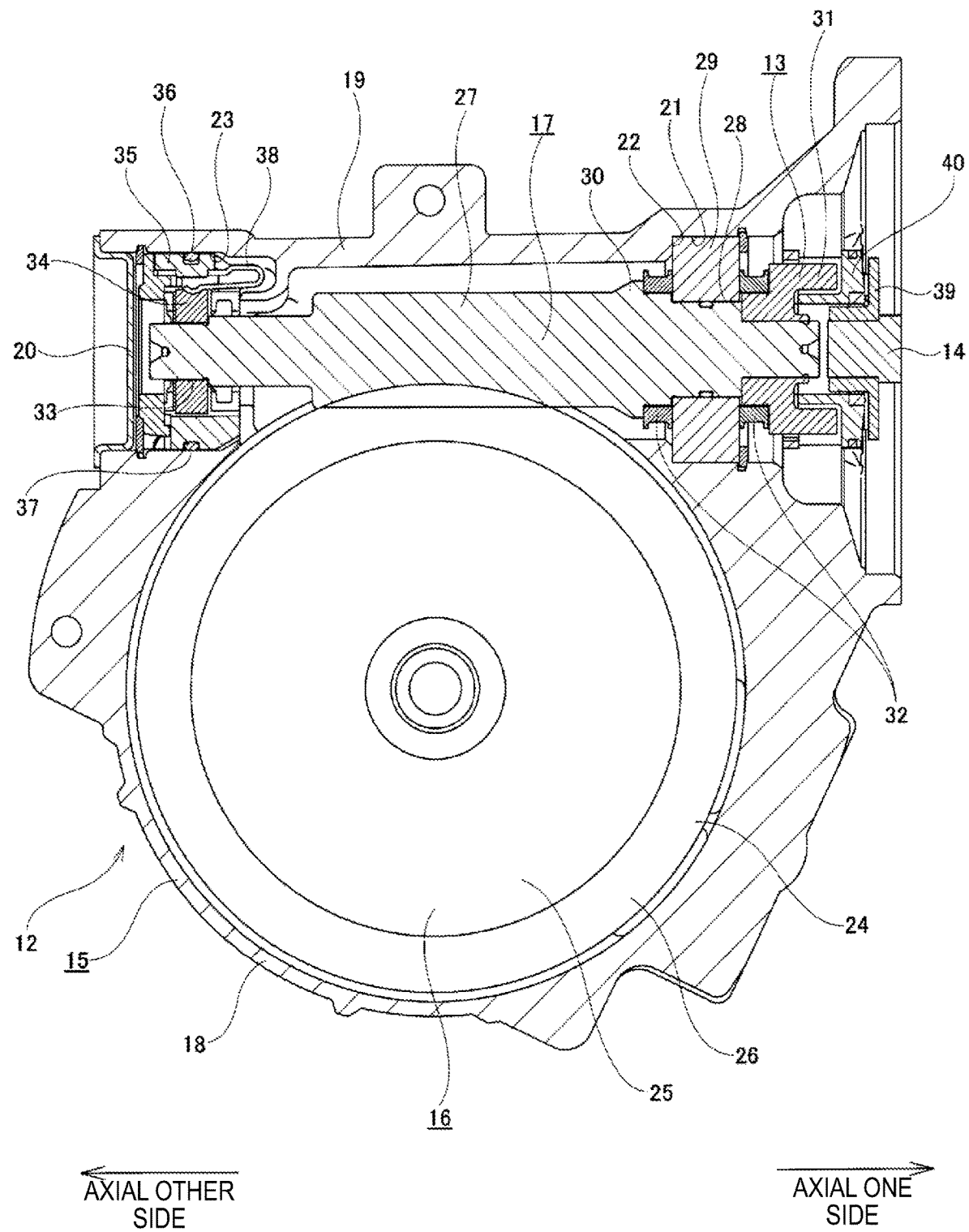
FIG. 2 is a cross-sectional view taken along the line A-A of FIG. 1.

FIGS. 1 to 14C illustrate an example according to an embodiment of the present invention. This example is an example in which a worm reducer-attached electric motor of the present invention is applied to a column assist type electric power steering device. In an electric power steering device 1, rotation of a steering wheel 2 is transmitted to an input shaft 4 of a steering gear unit 3. That is, the steering wheel 2 is supported and fixed to a rear end of a steering shaft 5, and a front end of the steering shaft 5 is connected to a rear end of an intermediate shaft 7 via a universal joint 6a. A front end of the intermediate shaft 7 is connected to the input shaft 4 via another universal joint 6b. Rotation of the input shaft 4 is converted into a linear motion in an axial direction of a rack shaft (not illustrated) arranged in a width direction of a vehicle body in the steering gear unit 3. When a pair of tie rods 8 connected to ends of the rack shaft on both sides in the axial direction are pushed and pulled along with the linear motion of the rack shaft, a steered vehicle wheel is given a steering angle. The steering shaft 5 is rotatably supported inside a steering column 9 supported by the vehicle body.

The electric power steering device 1 includes a worm reducer-attached electric motor 10. The electric power steering device 1 of this example is configured so that the force required for a driver to operate the steering wheel 2 can be reduced by applying the power of the worm reducer-attached electric motor 10 to the steering shaft 5. The worm reducer-attached electric motor 10 includes an electric motor 11, a worm reducer 12, and a torque transmission joint 13.

The electric motor 11 has an output shaft 14. The electric motor 11 rotationally drives the output shaft 14 in both directions based on energization.

The worm reducer 12 includes a housing 15, a worm wheel 16, and a worm 17.

The housing 15 includes a wheel accommodation portion 18 and a worm accommodation portion 19 having a central axis at a position twisted with respect to a central axis of the wheel accommodation portion 18 and having an axial intermediate portion opened in the wheel accommodation portion 18.

The wheel accommodation portion 18 is supported and fixed to a front end of the steering column 9 so that a central axis of the wheel accommodation portion 18 and a central axis of the steering column 9 are coaxial with each other.

The worm accommodation portion 19 is formed in a cylindrical shape and has opening portions at both ends in the axial direction. The opening portion on axial one side (right side in FIG. 2) of the worm accommodation portion 19 is closed by the electric motor 11 coupled and fixed to the housing 15. The opening portion on axial other side (left side in FIG. 2) of the worm accommodation portion 19 is closed by a lid body 20.

Regarding the worm accommodation portion 19, the worm 17 rotatably supported inside the worm accommodation portion 19, and the torque transmission joint 13 connecting the worm 17 and the output shaft 14 of the electric motor 11, the axial one side is a base end side of the worm 17 and refers to the right side of FIG. 2, FIG. 3B, FIG. 3C, FIG. 8, FIG. 9, FIG. 10B, FIG. 10C, FIG. 11B, FIG. 11C, FIG. 12B, and FIG. 12C, and the axial other side is a tip side of the worm 17 and refers to the left side of FIG. 2, FIG. 3B, FIG. 3C, FIG. 8, FIG. 9, FIG. 10B, FIG. 10C, FIG. 11B, FIG. 11C, FIG. 12B, and FIG. 12C.

The worm accommodation portion 19 has a cylindrical surface portion 21 having a cylindrical surface shape on an inner peripheral surface of an axial one side portion. In addition, the worm accommodation portion 19 has a step portion 22 which faces the axial one side and is provided at an axial other side end of the cylindrical surface portion 21. Further, the worm accommodation portion 19 has a guide holding portion 23 which has a cylindrical surface shape and is provided on an inner peripheral surface of an axial other side portion.

The worm wheel 16 has a wheel tooth 24 which is a helical gear on an outer peripheral surface, and is rotatably supported inside the wheel accommodation portion 18. In this example, the worm wheel 16 is supported and fixed so as to rotate integrally with the steering shaft 5 around the front end of the steering shaft 5 rotatably supported inside the wheel accommodation portion 18. The worm wheel 16 of this example is formed by coupling and fixing an outer wheel element 26 which is made of synthetic resin and has a wheel tooth 24 on an outer peripheral surface, around an inner wheel element 25 which is made of metal and has a circular plate shape.

The worm 17 has a screw-shaped worm tooth 27 which meshes with the wheel tooth 24 of the worm wheel 16 on an outer peripheral surface of the intermediate portion in the axial direction, and is rotatably supported inside the worm accommodation portion 19.

That is, the worm 17 is provided with a fitting cylinder portion 28 at a portion located further on the axial one side than the worm tooth 27. The fitting cylinder portion 28 is rotatably supported by a ball bearing 29 with respect to the cylindrical surface portion 21 of the worm accommodation portion 19. An outer ring of the ball bearing 29 is fitted in the cylindrical surface portion 21 in a state where the displacement in the axial direction is prevented. An inner ring of the ball bearing 29 is fitted onto the fitting cylinder portion 28 without rattling. In the worm 17, between a flange portion 30 provided on a portion adjacent to the axial one side of the worm tooth 27 and a first rotating member 31 of the torque transmission joint 13 externally fitted and fixed to the base end portion of the worm 17, the inner ring of the ball bearing 29 is pinched from both sides in the axial direction via a pair of elastic members 32. The ball bearing 29 has a radial gap between the outer ring and the inner ring and a ball. In short, the fitting cylinder portion 28 of the worm 17 is supported so as to be able to allow rotational and oscillating displacements with respect to the cylindrical surface portion 21 of the worm accommodation portion 19.

The structure which supports a portion of the worm 17, which is the portion located further on the axial one side than the worm tooth 27, with respect to the worm accommodation portion 19 so as to be able to allow rotational and oscillating displacements is not limited to the example described above, and various structures can be adopted.

The worm 17 is provided with a small diameter cylinder portion 33 at the tip portion thereof. The small diameter cylinder portion 33 is supported by a support bearing 34 and a guide member 35 with respect to the guide holding portion 23 of the worm accommodation portion 19 so as to be able to rotate freely and to recede from or approach the worm wheel 16. An inner ring of the support bearing 34 is externally fitted and fixed to the small diameter cylinder portion 33. An outer ring of the support bearing 34 is held inside the guide member 35 so as to be able to recede from or approach the worm wheel 16. The guide member 35 is held inside the guide holding portion 23 in a state where rotation is blocked. The guide member 35 locks an elastic ring 37 to a locking groove 36 provided on an outer peripheral surface over the entire circumference. Then, the elastic ring 37 presses a portion of the outer peripheral surface of the guide member 35 far from the worm wheel 16 against the guide holding portion 23 to suppress rattling with respect to the guide holding portion 23. The support bearing 34 is elastically urged toward the worm wheel 16 side by a leaf spring 38 arranged at an end on a side far from the worm wheel 16 in a portion between the outer ring of the support bearing 34 and the guide member 35. This suppresses backlash between the wheel tooth 24 and the worm tooth 27.

The mechanism for elastically urging the tip portion of the worm 17 toward the worm wheel 16 side is not limited to the example described above, and various structures can be adopted.

Figure 9:
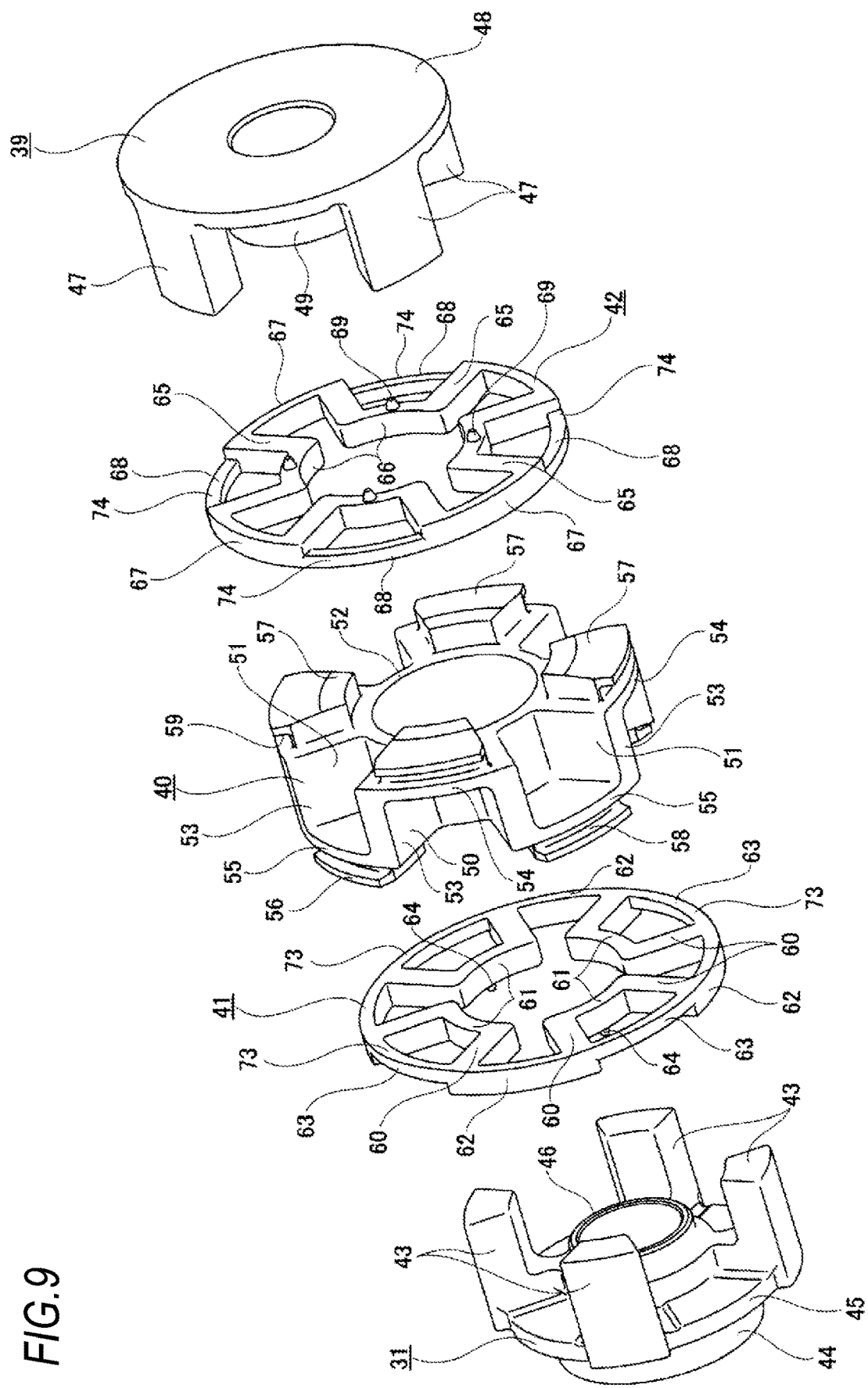
FIG. 9 is an exploded perspective view of the torque transmission joint of the example according to the embodiment of the present invention.
Figure 13:
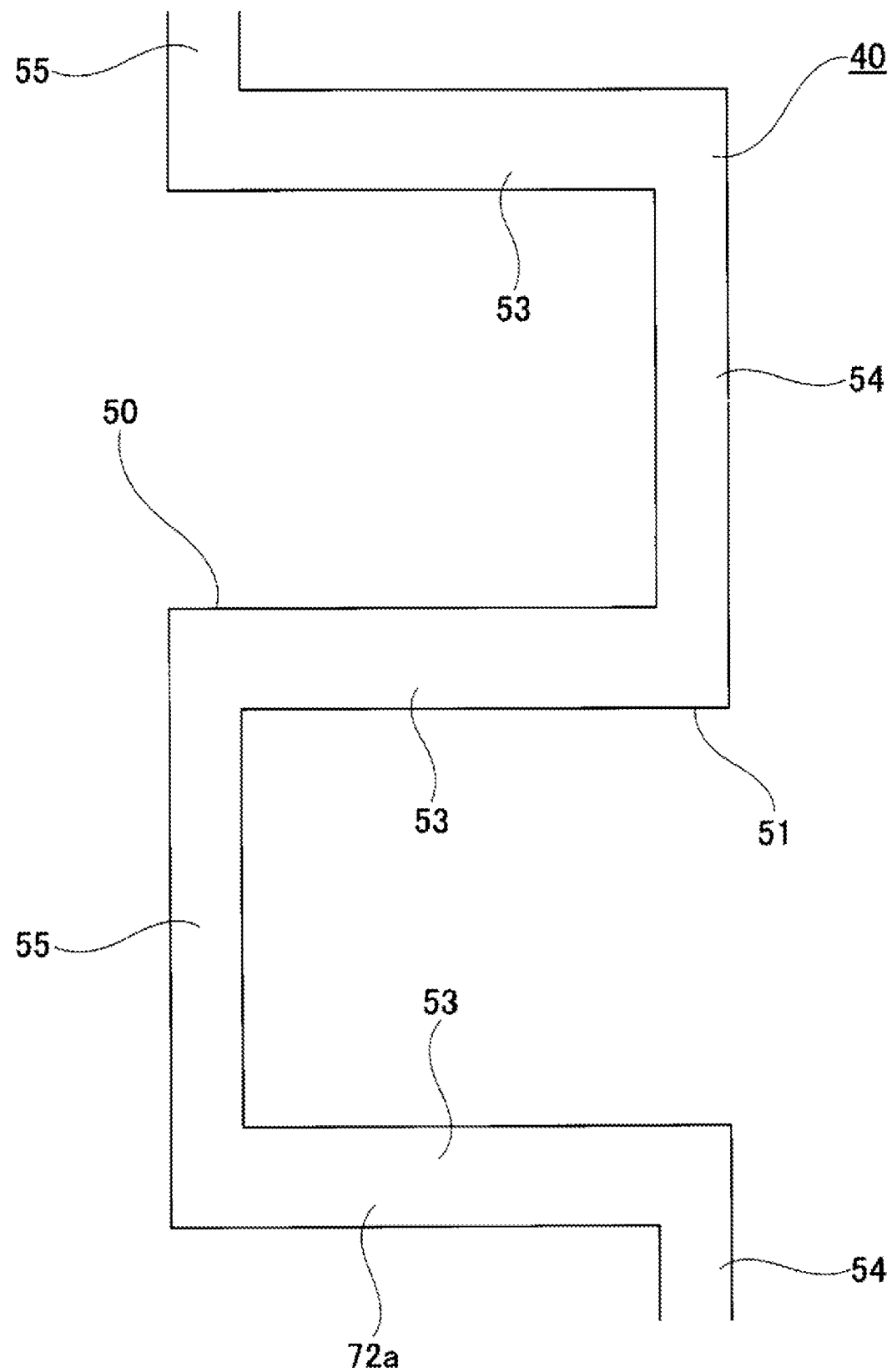
FIG. 13 is an enlarged view of the J portion of FIG. 12B.

The worm 17 has the base end portion connected to the output shaft 14 of the electric motor 11 via the torque transmission joint 13 so that torque can be transmitted. The torque transmission joint 13 includes, for example, as illustrated in FIG. 9, the first rotating member 31, a second rotating member 39, a coupling 40, a first elastic body 41, and a second elastic body 42, each of which is coaxially arranged.

The first rotating member 31 has first convex portions 43 protruding toward the axial one side at a plurality of locations in a circumferential direction on an axial one side surface. Specifically, as illustrated in FIGS. 10A to 10C, the first rotating member 31 includes a base portion 44 having a cylindrical shape, a flange portion 45 having an annular shape and protruding from an axial one side end of the base portion 44 toward the outside in a radial direction over the entire circumference, and first convex portions 43 protruding toward the axial one side from radial outer ends of a plurality of equidistant circumferential locations (four locations in the illustrated example) on an axial one side surface of the flange portion 45. The first convex portion 43 has a fan-shaped end surface shape when viewed from the axial direction. Further, the first rotating member 31 has a protruding portion 46 having a cylindrical shape and protruding from a radial inner end of an axial one side surface of the base portion 44 toward the axial one side over the entire circumference. The protruding portion 46 is a portion for ensuring the fitting length of the first rotating member 31 with respect to a base end portion of the worm 17.

The first rotating member 31 is externally fitted and fixed to the base end portion of the worm 17 so as to be able to transmit torque. The first rotating member 31 is made of a synthetic resin, a sintered metal, or the like, which has higher rigidity (difficult to elastically deform) than an elastic material such as an elastomer such as rubber forming the first elastic body 41.

The second rotating member 39 has second convex portions 47 protruding toward axial other side at a plurality of locations in the circumferential direction on an axial other side surface. Specifically, as illustrated in FIGS. 11A to 11C, the second rotating member 39 includes a base portion 48 having an annular plate shape and second convex portions 47 protruding from radial outer ends of a plurality of equidistant circumferential locations (four locations in the illustrated example) on an axial other side surface of the base portion 48 toward the axial other side. The second convex portion 47 has a fan-shaped end surface shape when viewed from the axial direction. Further, the second rotating member 39 has a protruding portion 49 having a cylindrical shape and protruding from a radial inner end of the axial other side surface of the base portion 48 toward the axial other side over the entire circumference. The protruding portion 49 is a portion for ensuring the fitting length of the second rotating member 39 with respect to the tip portion of the output shaft 14 of the electric motor 11.

The second rotating member 39 is externally fitted and fixed to the tip portion of the output shaft 14 of the electric motor 11 so as to be able to transmit torque. The second rotating member 39 is made of a synthetic resin, a sintered metal, or the like, which has higher rigidity (difficult to elastically deform) than an elastic material such as an elastomer such as rubber forming the second elastic body 42. The second rotating member 39 can be made of the same material as the material forming the first rotating member 31, or can be made of a different material.

The coupling 40 has a first recess portion 50 and a second recess portion 51. The first recess portions 50 are opened on an axial other side surface and the outer peripheral surface at a plurality of locations in the circumferential direction of the coupling 40, and the first recess portion 50 is engaged with each first convex portion 43 of the first rotating member 31 so as to allow relative displacement in the circumferential direction. The second recess portions 51 are opened on an axial one side surface and the outer peripheral surface at a plurality of locations in the circumferential direction deviating from the first recess portions 50 of the coupling 40 in the circumferential direction, and the second recess portion 51 is engaged with each second convex portion 47 of the second rotating member 39 so as to allow relative displacement in the circumferential direction.

In this example, as illustrated in FIGS. 12A to 12C, the coupling 40 includes a boss portion 52 having a cylindrical shape, a plurality of arm portions 53, a plurality of first side plate portions 54, and a plurality of second side plate portions 55. The shape of the boss portion 52 is not limited to a cylindrical shape, and may be a columnar shape.

Each of the arm portions 53 is formed in a rectangular plate shape, and the arm portions 53 protrude radially outward from a plurality of circumferential locations of an outer peripheral surface of the boss portion 52. In this example, side surfaces of the arm portion 53 on both sides in the circumferential direction are formed of flat surfaces parallel to each other.

Each of the first side plate portions 54 protrudes radially outward from a plurality of circumferential locations on an outer peripheral surface of an axial one side end of the boss portion 52, and connects axial one side ends of a pair of arm portions 53 adjacent to each other in the circumferential direction. Each of the first side plate portions 54 has a fan-shaped end surface shape when viewed from the axial direction.

Each of the second side plate portions 55 protrude radially outward from a plurality of circumferential locations deviating from the first side plate portions 54 in the circumferential direction on an outer peripheral surface of an axial other side end of the boss portion 52, and connects axial other side ends of the pair of arm portions 53 adjacent to each other in the circumferential direction. That is, the first side plate portion 54 and the second side plate portion 55 are alternately arranged on the outer peripheral surface of the boss portion 52 in the circumferential direction. Each of the second side plate portions 55 has a fan-shaped end surface shape when viewed from the axial direction.

Each of the first recess portions 50 is defined by the outer peripheral surface of the boss portion 52, each axial other side surface of the first side plate portion 54, and circumferential side surfaces of a pair of arm portions 53 facing each other with axial one side ends connected to each of the first side plate portion 54. Each of the first convex portions 43 of the first rotating member 31 is engaged with each of the first recess portions 50 so as to allow relative displacement in the circumferential direction. That is, in a state where the first convex portion 43 is placed inside the first recess portion 50, there is a circumferential gap between at least one of portions between the inner surfaces on both circumferential sides of the first recess portion 50 and the outer surfaces on both circumferential sides of the first convex portion 43. Further, there is a radial gap between the radial inner surface of the first convex portion 43 and the outer peripheral surface of the boss portion 52.

Each of the second recess portions 51 is defined by the outer peripheral surface of the boss portion 52, each axial one side surface of the second side plate portion 55, and circumferential side surfaces of a pair of arm portions 53 facing each other with axial other side ends connected to each of the second side plate portion 55. Each of the second convex portions 47 of the second rotating member 39 is engaged with each of the second recess portions 51 so as to allow relative displacement in the circumferential direction. That is, in a state where the second convex portion 47 is placed inside the second recess portion 51, there is a circumferential gap between at least one of portions between the inner surfaces on both circumferential sides of the second recess portion 51 and the outer surfaces on both circumferential sides of the second convex portion 47. Further, there is a radial gap between the radial inner surface of the second convex portion 47 and the outer peripheral surface of the boss portion 52.

In other words, each of the first convex portions 43 of the first rotating member 31 and each of the second convex portions 47 of the second rotating member 39 are alternately arranged in the circumferential direction. Further, the arm portion 53 of the coupling 40 is arranged so as to allow circumferential displacement between the outer surface in the circumferential direction of the first convex portion 43 and the outer surface in the circumferential direction of the second convex portion 47.

Figure 4:
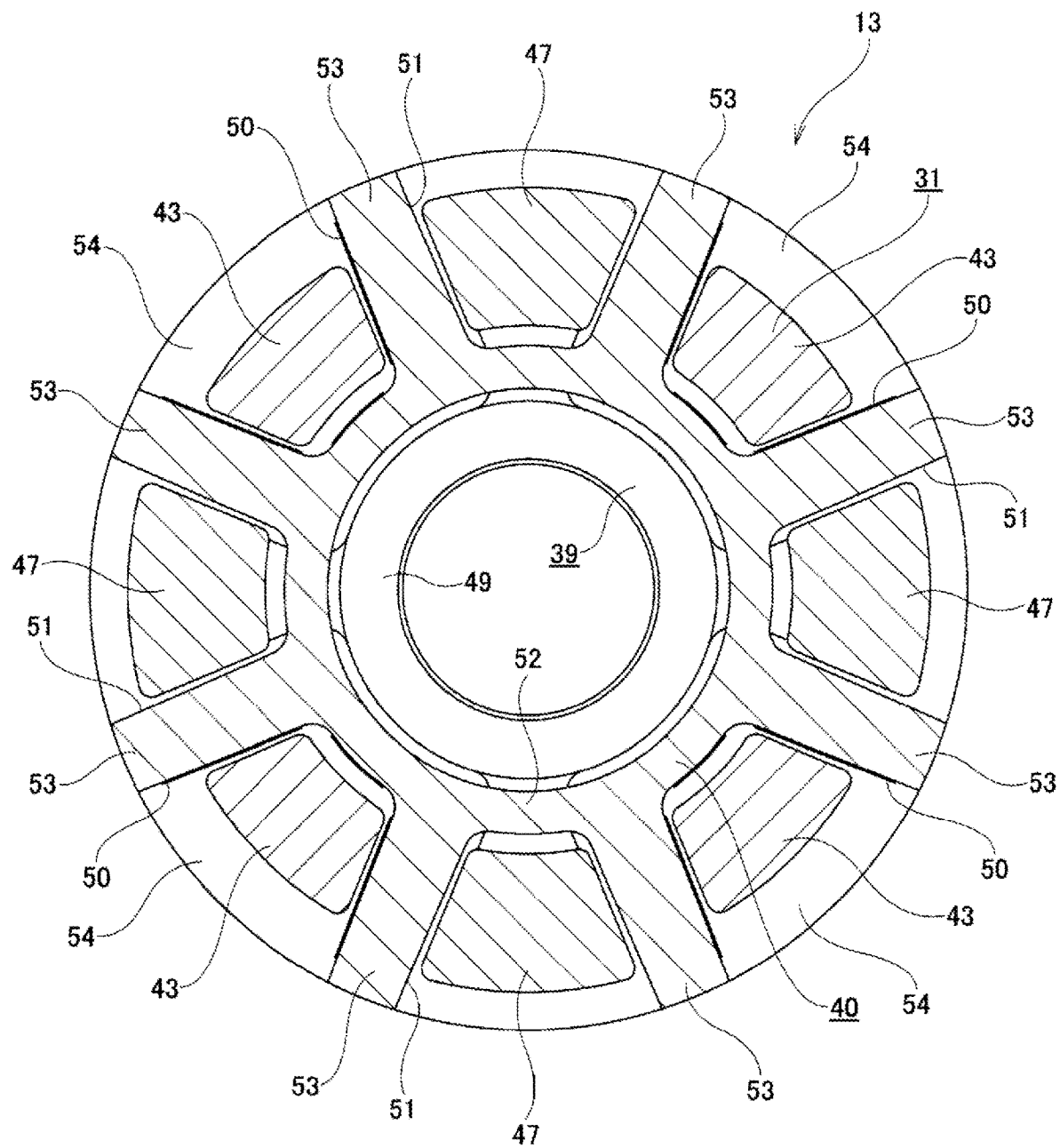
FIG. 4 is a cross-sectional view taken along the line C-C of FIG. 3B.
Figure 5:
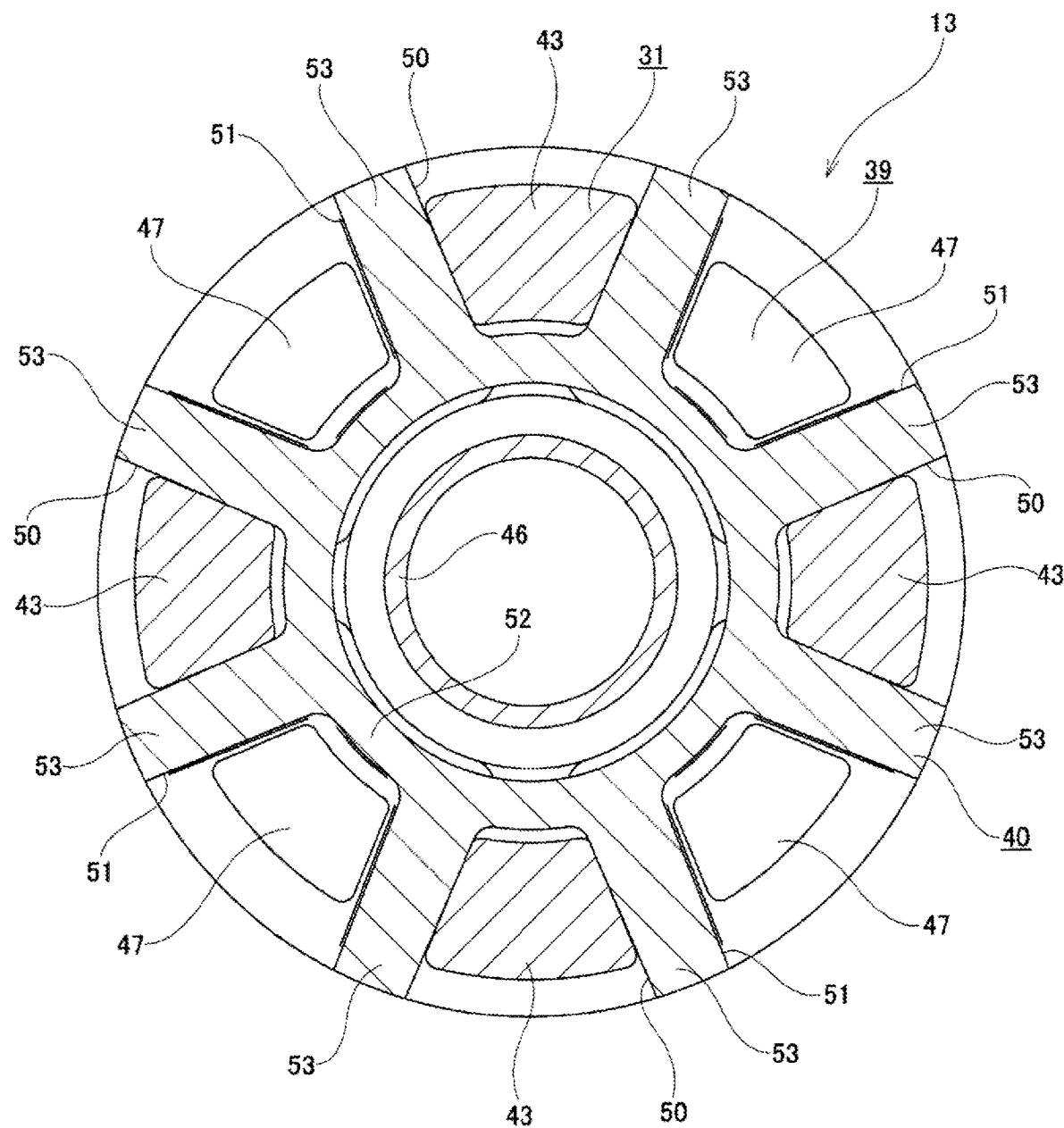
FIG. 5 is a cross-sectional view taken along the line D-D of FIG. 3C.
Figure 6:
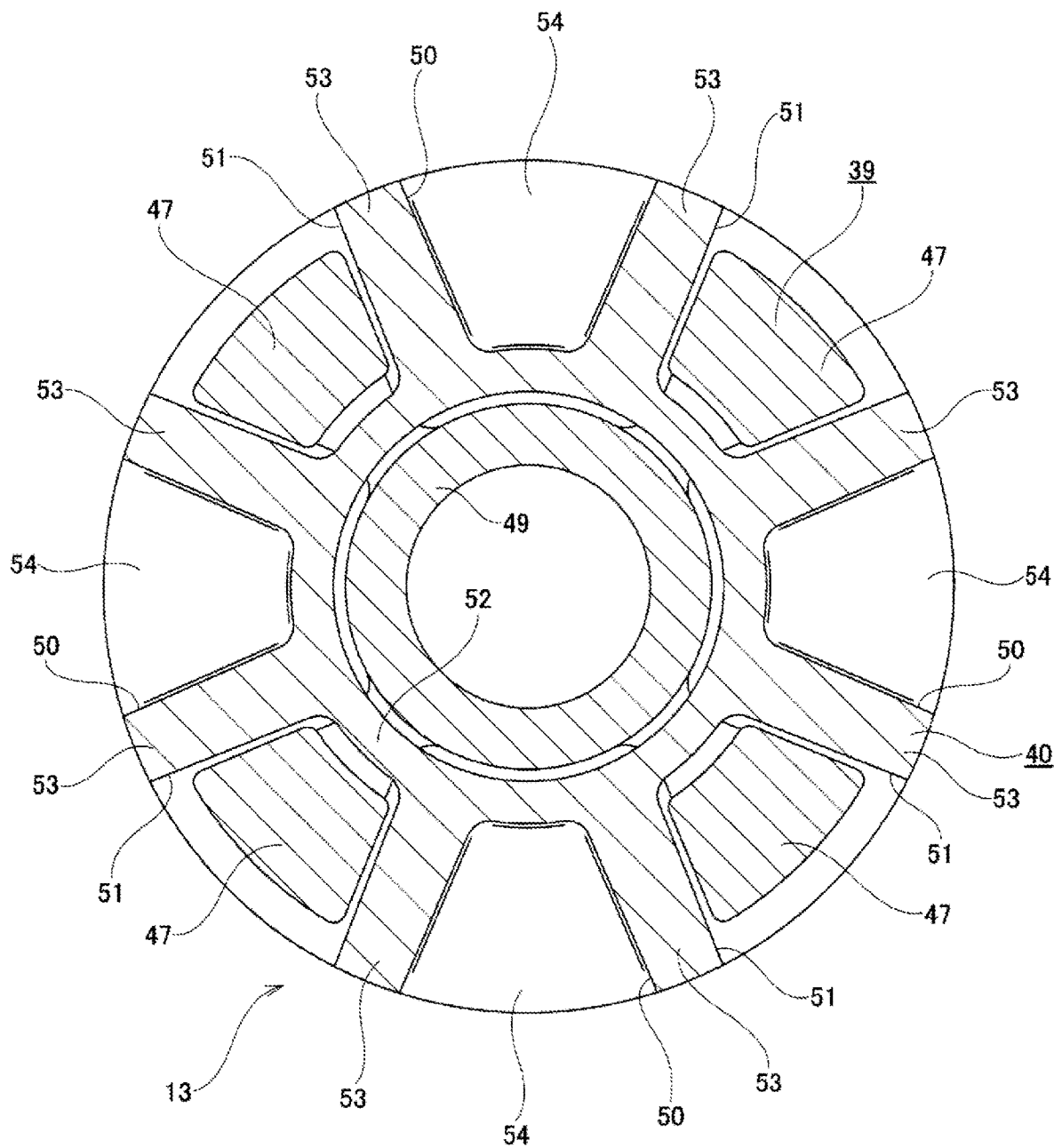
FIG. 6 is a cross-sectional view taken along the line E-E of FIG. 3C.
Figure 7:
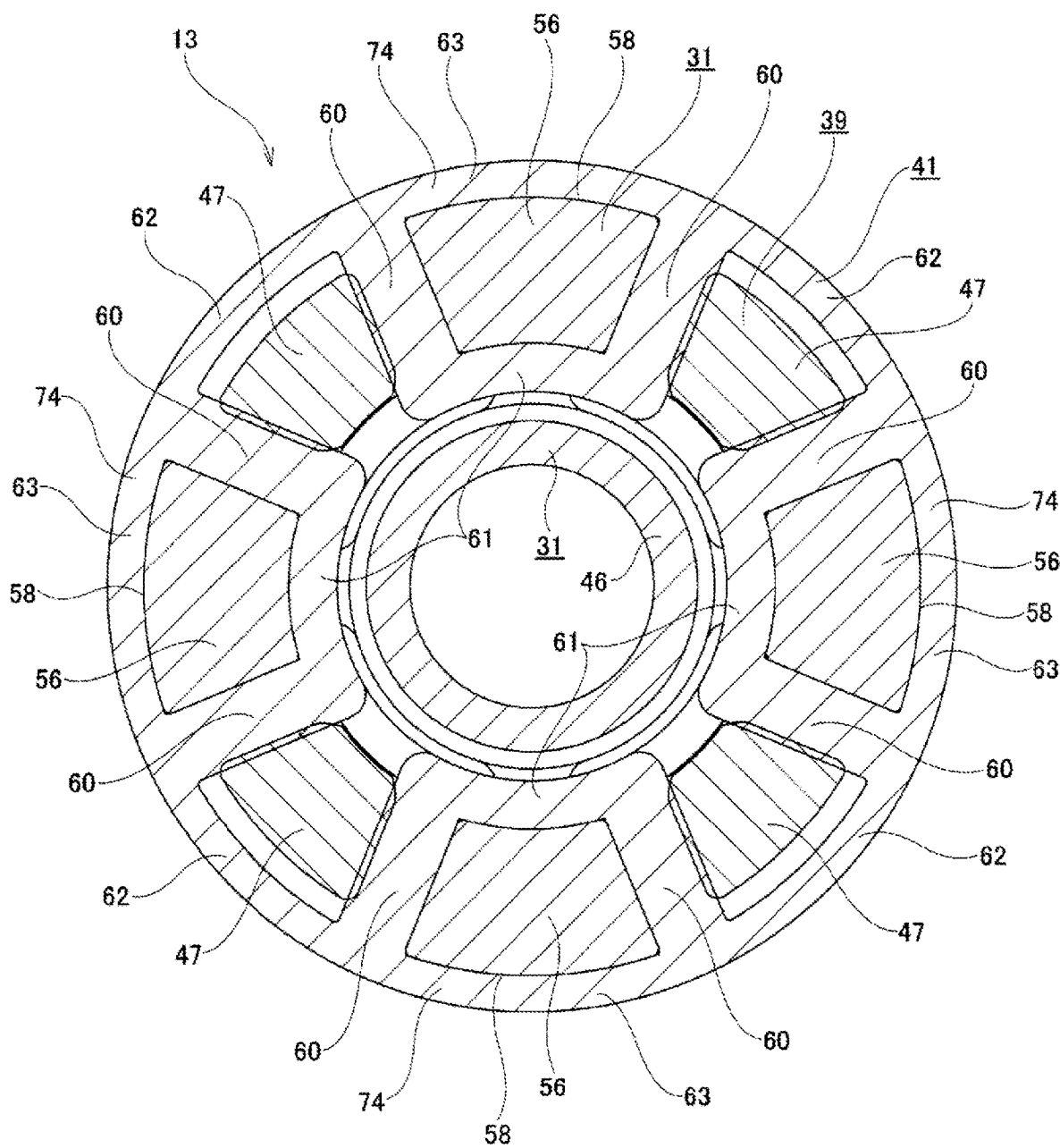
FIG. 7 is a cross-sectional view taken along the line F-F of FIG. 3C.
Figure 8:
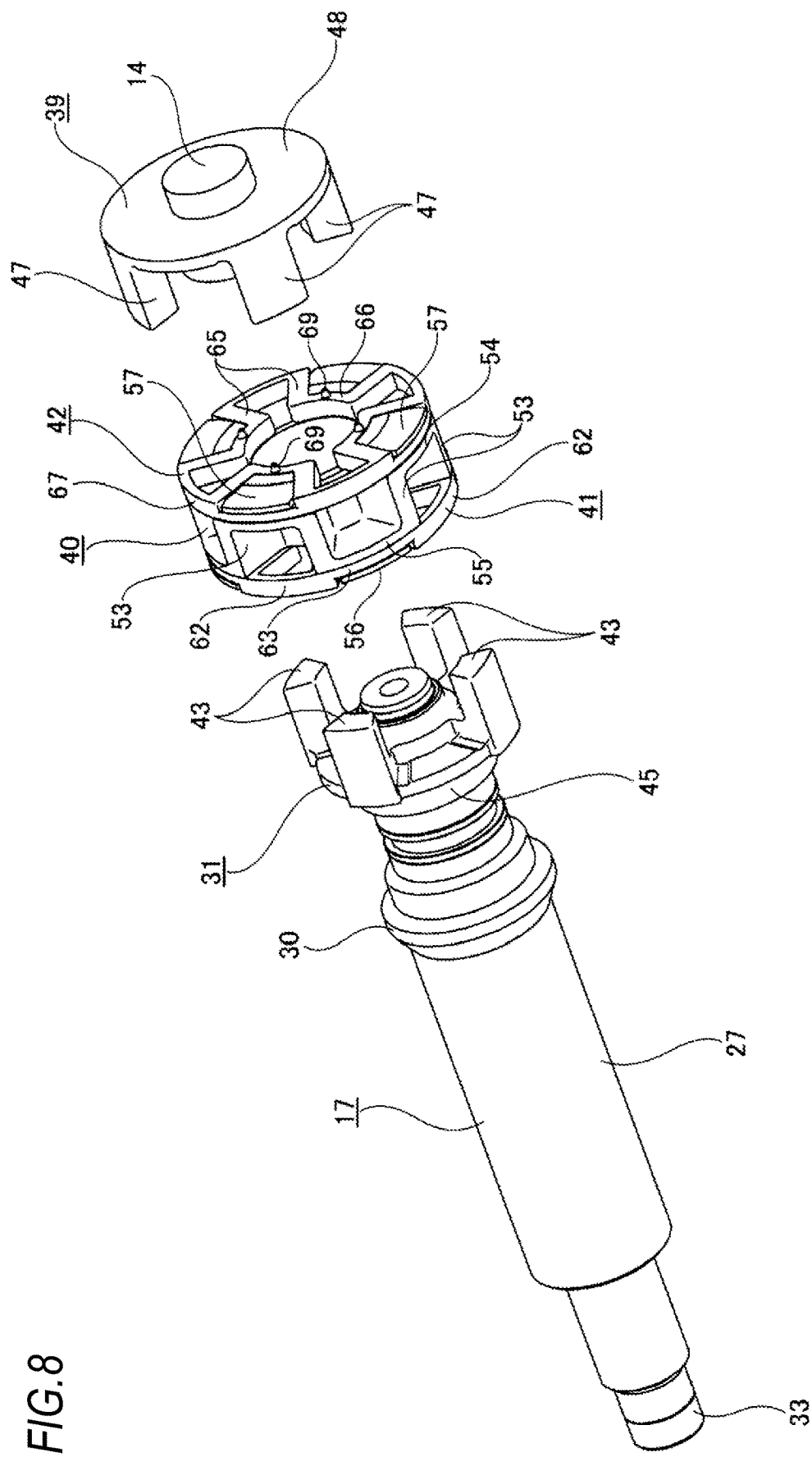
FIG. 8 is a perspective view illustrating the torque transmission joint of the example according to the embodiment of the present invention, in which a part of the torque transmission joint is disassembled and a second rotating member is supported and fixed to a worm.

Further, in a state where the first convex portion 43 is arranged inside the first recess portion 50 and the second convex portion 47 is arranged inside the second recess portion 51, at least a part of the first convex portion 43 and the second convex portion 47 overlap in the axial direction. That is, as illustrated in FIG. 4, in the C-C cross section of FIG. 3B, the first convex portion 43 and the second convex portion 47 face each other in the circumferential direction. Therefore, even when the coupling 40 is damaged, the torque transmission function can be maintained by the first convex portion 43 and the second convex portion 47.

Further, the coupling 40 has a first support portion 56 for supporting the first elastic body 41 on an axial other side surface of each of the second side plate portions 55. Also, the coupling 40 has a second support portion 57 for supporting the second elastic body 42 on an axial one side surface of each of the first side plate portions 54.

Each of the first support portions 56 has a fan-shaped end surface shape when viewed from the axial direction, and protrudes from the axial other side surface of the second side plate portion 55 toward the axial other side. In this example, each of the first support portions 56 has a first locking groove 58 extending circumferentially on the radial outer surface.

Each of the second support portions 57 has a fan-shaped end surface shape when viewed from the axial direction, and protrudes from an axial one side surface of the first side plate portion 54 toward the axial one side. In this example, each of the second support portions 57 has a second locking groove 59 extending in the circumferential direction on the radial outer surface.

The coupling 40 is made of a material that is more rigid (difficult to elastically deform) than the materials forming the first elastic body 41 and the second elastic body 42, and that can reduce the impact of contact with the first convex portion 43 of the member 31 and the second convex portion 47 of the second rotating member 39. Specifically, the coupling 40 can be made of polyphenylene sulfide (PPS), polyetheretherketone (PEEK), or nylon, a resin obtained by mixing reinforcing fibers with these, an elastomer such as rubber, a belt material obtained by reinforcing rubber with woven cloth, or the like.

Figure 14B:
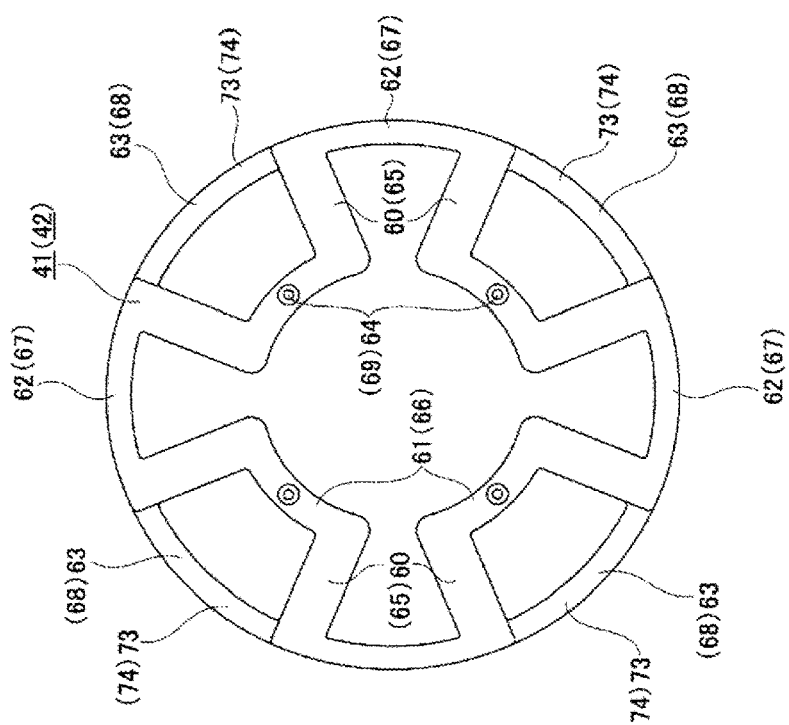
FIG. 14B is an end view seen from the right side of FIG. 14A.
Figure 14A:
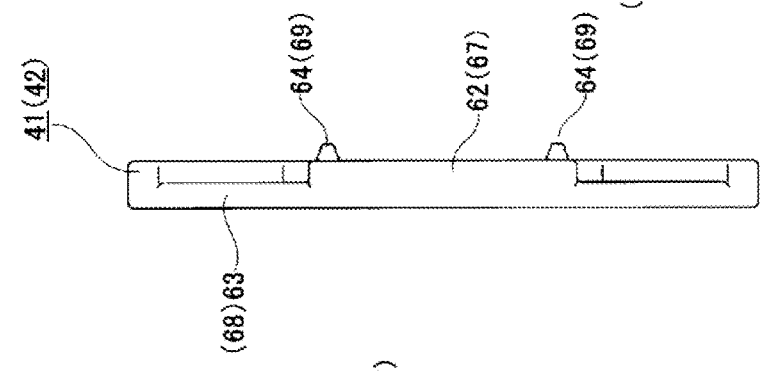
FIG. 14A is a side view of an elastic body.
Figure 14C:
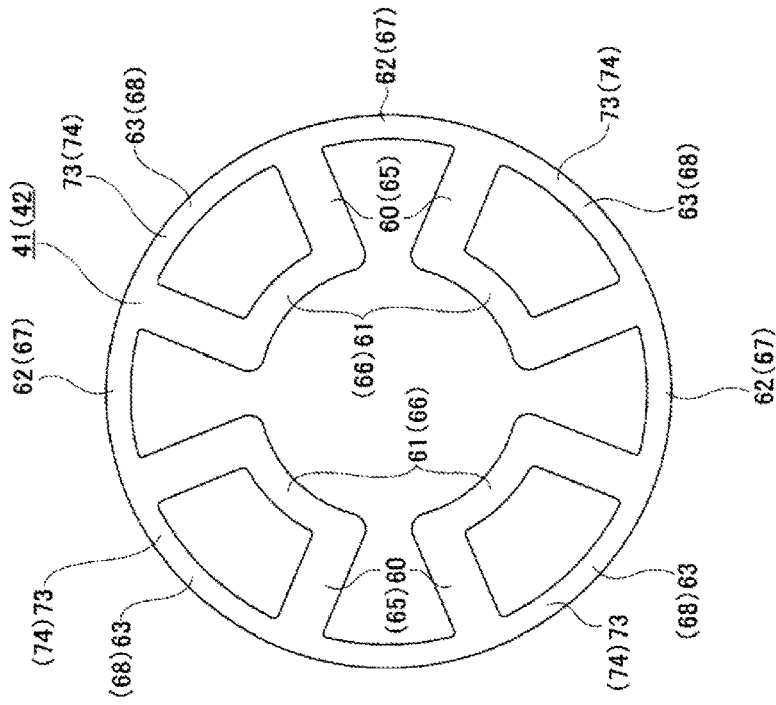
FIG. 14C is an end view seen from the left side of FIG. 14A.

The first elastic body 41 has a plurality of first elastic pieces 60 pinched in the circumferential direction between the respective first convex portions 43 of the first rotating member 31 and the coupling 40. Specifically, as illustrated in FIGS. 14A to 14C, the first elastic body 41 includes a plurality of (eight in the illustrated example) first elastic pieces 60, a plurality of (four each in the illustrated example) first inner diameter side connection pieces 61 and first outer diameter side connection pieces 62, which are arranged alternately in the circumferential direction, and a plurality of (four in the illustrated example) first locking pieces 63.

Each of the first elastic pieces 60 is formed in a rectangular columnar shape and is arranged in the radial direction.

Each of the first inner diameter side connecting pieces 61 connects radial inner ends of a pair of first elastic pieces 60 adjacent to each other in the circumferential direction. Each of the first inner diameter side connecting pieces 61 has an arcuate end surface shape when viewed from the axial direction.

Each of the first outer diameter side connection pieces 62 is arranged at a position deviated from the first inner diameter side connection piece 61 in the circumferential direction. In addition, each of the first outer diameter side connecting pieces 62 connects radial outer ends of a pair of first elastic pieces 60 adjacent to each other in the circumferential direction. Each of the first outer diameter side connection pieces 62 has an arcuate end surface shape when viewed from the axial direction.

Each of the first locking pieces 63 is placed at a position where the circumferential phase of the first locking piece 63 coincides with that of the first outer diameter side connection piece 61, in other words, at a position deviating from the first outer diameter side connection piece 62 in the circumferential direction. In addition, each of the first locking pieces 63 connects radial outer ends of a pair of first elastic pieces 60 adjacent to each other in the circumferential direction. Each of the first locking pieces 63 has an arcuate end surface shape when viewed from the axial direction. That is, the first outer diameter side connection piece 62 and the first locking piece 63 are alternately arranged in the circumferential direction so as to form an annular shape as a whole.

In this example, the axial thickness of the first locking piece 63 is made smaller than the axial thickness of the first elastic piece 60, the first inner diameter side connection piece 61, and the first outer diameter side connection piece 62. Specifically, the axial thickness of the first locking piece 63 is set to about half the axial thickness of the first elastic piece 60, the first inner diameter side connection piece 61, and the first outer diameter side connection piece 62. The axial thicknesses of the first elastic piece 60, the first inner diameter side connection piece 61, and the first outer diameter side connection piece 62 are all the same. That is, the axial other side surface of the first locking piece 63 of the first elastic body 41 is located further on the axial one side than the axial other side surfaces of remaining portions.

Further, the circumferential dimension of a portion between a pair of first elastic pieces 60 having radial outer ends connected to the first outer diameter side connection piece 62 is smaller than the circumferential dimension of the first recess portion 50 of the coupling 40.

The first elastic body 41 has a first supported portion 73 having a substantially trapezoidal annular shape and including a pair of first elastic pieces 60 adjacent to each other in the circumferential direction, the first inner diameter side connection piece 61, and the first locking piece 63. Then, by engaging (fitting) each of the first supported portions 73 with each of the first support portions 56, the first elastic body 41 is supported by the axial other side end of the coupling 40. Specifically, the first locking piece 63 is locked to the first locking groove 58, and the first support portion 56 is elastically pinched from both sides in the circumferential direction by a pair of first elastic pieces 60, and the radial outer surface of the first inner diameter side connection piece 61 is elastically abutted onto the radial inner surface of the first support portion 56, in such a manner that the first elastic body 41 is supported at the axial other side end of the coupling 40.

The first convex portion 43 of the first rotating member 31 is inserted in the portion between the pair of first elastic pieces 60 having the radial outer ends connected to the first outer diameter side connection piece 62 of the first elastic body 41. That is, each of the first elastic pieces 60 is pinched between a circumferential side surface of each of the first convex portions 43 of the first rotating member 31 and a circumferential side surface of each of the first support portions 56 of the coupling 40. The radial outer surface of the first convex portion 43 may be in contact with the radial inner surface of the first outer diameter side connection piece 62, or may be non-contact therewith.

Further, the first elastic body 41 has a plurality of (four in the illustrated example) first protrusions 64 protruding toward the axial other side on the axial other side surface. Specifically, the first elastic body 41 has the first protrusion 64 at a center position in the circumferential direction of an axial other side surface of each of the first inner diameter side connection pieces 61. When a central axis of the coupling 40 matches a central axis of the worm 17 and/or a central axis of the output shaft 14 (when the coupling 40 is not tilted with respect to the axial direction), each of the first protrusions 64 is not brought into contact with an axial one side surface of the flange portion 45 of the first rotating member 31. On the contrary, when the central axis of the coupling 40 does not match the central axis of the worm 17 and/or the central axis of the output shaft 14 (when the coupling 40 is tilted with respect to the axial direction), each of the first protrusions 64 is elastically brought into contact with the axial one side surface of the flange portion 45 of the first rotating member 31.

The second elastic body 42 has a plurality of second elastic pieces 65 pinched in the circumferential direction between the respective second convex portions 47 of the second rotating member 39 and the coupling 40. In this example, the second elastic body 42 has the same specifications as the first elastic body 41 (same shape, dimensions, and material). That is, as illustrated in FIGS. 14A to 14C, the second elastic body 42 includes the plurality of (eight in the illustrated example) second elastic pieces 65, a plurality of (four each in the illustrated example) second inner diameter side connection pieces 66 and second outer diameter side connection pieces 67, which are arranged alternately in the circumferential direction, and a plurality of (four in the illustrated example) second locking pieces 68.

The second elastic body 42 has a second supported portion 74 having a substantially trapezoidal annular shape and including a pair of second elastic pieces 65 adjacent to each other in the circumferential direction, the second inner diameter side connection piece 66, and the second locking piece 68. Then, by engaging (fitting) each of the second supported portions 74 with each of the second support portions 57, the second elastic body 42 is supported by an axial one side end of the coupling 40. Specifically, the second locking piece 68 is locked to the second locking groove 59, and the second support portion 57 is elastically pinched from both sides in the circumferential direction by a pair of second elastic pieces 65, and the radial outer surface of the second inner diameter side connection piece 66 is elastically abutted onto the radial inner surface of the second support portion 57, in such a manner that the second elastic body 42 is supported at the axial one side end of the coupling 40.

The second convex portion 47 of the second rotating member 39 is inserted in the portion between the pair of second elastic pieces 65 having the radial outer ends connected to the second outer diameter side connection piece 67 of the second elastic body 42. That is, each of the second elastic pieces 65 is pinched between a circumferential side surface of each of the second convex portions 47 of the second rotating member 39 and a circumferential side surface of each of the second support portions 57 of the coupling 40. The radial outer surface of the second convex portion 47 may be in contact with the radial inner surface of the second outer diameter side connection piece 67, or may be non-contact therewith.

Further, the second elastic body 42 has a plurality of (four in the illustrated example) second protrusions 69 protruding toward the axial one side on the axial one side surface. Specifically, the second elastic body 42 has the second protrusion 69 at a center position in the circumferential direction of an axial one side surface of each of the second inner diameter side connection pieces 66. When a central axis of the coupling 40 matches the central axis of the worm 17 and/or the central axis of the output shaft 14 (when the coupling 40 is not tilted with respect to the axial direction), each of the second protrusions 64 is not brought into contact with the axial other side surface of the base portion 48 of the second rotating member 39. On the contrary, when the central axis of the coupling 40 does not match the central axis of the worm 17 and/or the central axis of the output shaft 14 (when the coupling 40 is tilted with respect to the axial direction), each of the second protrusions 64 is elastically brought into contact with the axial other side surface of the base portion 48 of the second rotating member 39.

In the worm reducer-attached electric motor 10 of this example, when the torque transmitted between the output shaft 14 of the electric motor 11 and the worm 17 is relatively small, as the output shaft 14 rotates, the circumferential outer surface of the second convex portion 47 of the second rotating member 39 presses the circumferential outer surface of the second support portion 57 of the coupling 40 in the circumferential direction via the second elastic piece 65 of the second elastic body 42. Then, as the coupling 40 rotates, the circumferential outer surface of the first support portion 56 of the coupling 40 presses the circumferential outer surface of the first convex portion 43 of the first rotating member 31 via the first elastic piece 60 of the first elastic body 41. In this way, the rotational torque of the output shaft 14 is transmitted to the worm 17.

On the other hand, when the torque transmitted between the output shaft 14 and the worm 17 becomes large, the second elastic piece 65 of the second elastic body 42 is elastically crushed in the circumferential direction between the circumferential outer surface of the second support portion 57 of the coupling 40 and the circumferential outer surface of the second convex portion 47 of the second rotating member 39, and the first elastic piece 60 of the first elastic body 41 is elastically crushed in the circumferential direction between the circumferential outer surface of the first support portion 56 of the coupling 40 and the circumferential outer surface of the first convex portion 43 of the first rotating member 31. Then, the circumferential outer surface of the second convex portion 47 of the second rotating member 39 and the circumferential inner surface of the second recess portion 51 of the coupling 40 are in direct collision-contact (abutment) with each other, and the circumferential outer surface of the first convex portion 43 of the first rotating member 31 and the circumferential inner surface of the first recess portion 50 of the coupling 40 are in direct collision-contact with each other. Since the momentum of this collision-contact is weakened by the first elastic body 41 and the second elastic body 42, with the collision-contact, it is possible to prevent abnormal noise such as a jarring rattling noise from being generated at an abutment portion between the circumferential outer surface of the second convex portion 47 and the circumferential inner surface of the second recess portion 51 and an abutment portion between the circumferential outer surface of the first convex portion 43 and the circumferential inner surface of the first recess portion 50. Further, in this state, most of the rotational torque of the output shaft 14 is transmitted to the coupling 40 from the abutment portion between the circumferential outer surface of the second convex portion 47 and the circumferential inner surface of the second recess portion 51, and most of the torque transmitted to the coupling 40 is transmitted to the worm 17 from the abutment portion between the circumferential outer surface of the first convex portion 43 and the circumferential inner surface of the first recess portion 50.

Further, in the worm reducer-attached electric motor 10 of this example, even when the worm 17 is oscillated and displaced, or the central axis of the worm 17 and the central axis of the output shaft 14 do not match due to eccentricity, the coupling 40 is tilted with respect to the central axis of the worm 17 and/or the central axis of the output shaft 14 while elastically deforming the first elastic body 41 and/or the second elastic body 42, in such a manner that the torque transmission between the output shaft 14 and the worm 17 can be performed smoothly.

Further, in this example, the first elastic body 41 has the first protrusion 64 at the center position in the circumferential direction of an axial other side surface of each of the first inner diameter side connection pieces 61. When the central axis of the coupling 40 matches the central axis of the worm 17 and/or the central axis of the output shaft 14 (when the coupling 40 is not tilted with respect to the axial direction), each of the first protrusions 64 is not brought into contact with the axial one side surface of the flange portion 45 of the first rotating member 31. On the contrary, when the central axis of the coupling 40 does not match the central axis of the worm 17 and/or the central axis of the output shaft 14 (when the coupling 40 is tilted with respect to the axial direction), each of the first protrusions 64 is elastically brought into contact with the axial one side surface of the flange portion 45 of the first rotating member 31. Therefore, when the coupling 40 is tilted with respect to the central axis of the worm 17 and/or the central axis of the output shaft 14, the velocity at which the axial one side surface of the flange portion 45 of the first rotating member 31 collides with the first protrusion 64 can be made smaller (slower) than when the first protrusion 64 is arranged in a radial outer portion. Therefore, it is possible to suppress the abnormal noise caused by the axial one side surface of the flange portion 45 of the first rotating member 31 colliding with the first protrusion 64.

Similarly, the second elastic body 41 has the second protrusion 69 at the center position in the circumferential direction of an axial other side surface of each of the second inner diameter side connection pieces 66. When the central axis of the coupling 40 matches the central axis of the worm 17 and/or the central axis of the output shaft 14 (when the coupling 40 is not tilted), each of the second protrusions 69 is not brought into contact with the axial other side surface of the base portion 48 of the second rotating member 39. On the contrary, when the central axis of the coupling 40 does not match the central axis of the worm 17 and/or the central axis of the output shaft 14 (when the coupling 40 is tilted), each of the second protrusions 69 is elastically brought into contact with the axial other side surface of the base portion 48 of the second rotating member 39. Therefore, when the coupling 40 is tilted with respect to the central axis of the worm 17 and/or the central axis of the output shaft 14, the velocity at which the axial other side surface of the base portion 48 of the second rotating member 39 collides with the second protrusion 69 can be made smaller (slower). Therefore, it is possible to suppress the abnormal noise caused by the axial other side surface of the base portion 48 of the second rotating member 39 colliding with the second protrusion 64.

In addition, when carrying out the present invention, it is possible to make the rigidity of the first elastic body and the rigidity of the second elastic body different from each other, and it is also possible to make the circumferential gap between the first convex portion and the first recess portion and the circumferential gap between the second convex portion and the second recess portion different from each other. As a result, the magnitude of the transmission torque at which the circumferential outer surface of the first convex portion and the circumferential inner surface of the first recess portion are brought into collision-contact with each other can be different from the magnitude of the transmission torque at which the circumferential outer surface of the second convex portion and the circumferential inner surface of the second recess portion are brought into collision-contact with each other. As a result, the torque transmission characteristics between the output shaft of the electric motor and the worm can be divided into multiple stages, and thus the operation feeling of the steering wheel can be improved.

Modification Example of One Example of Embodiment

Figure 15:
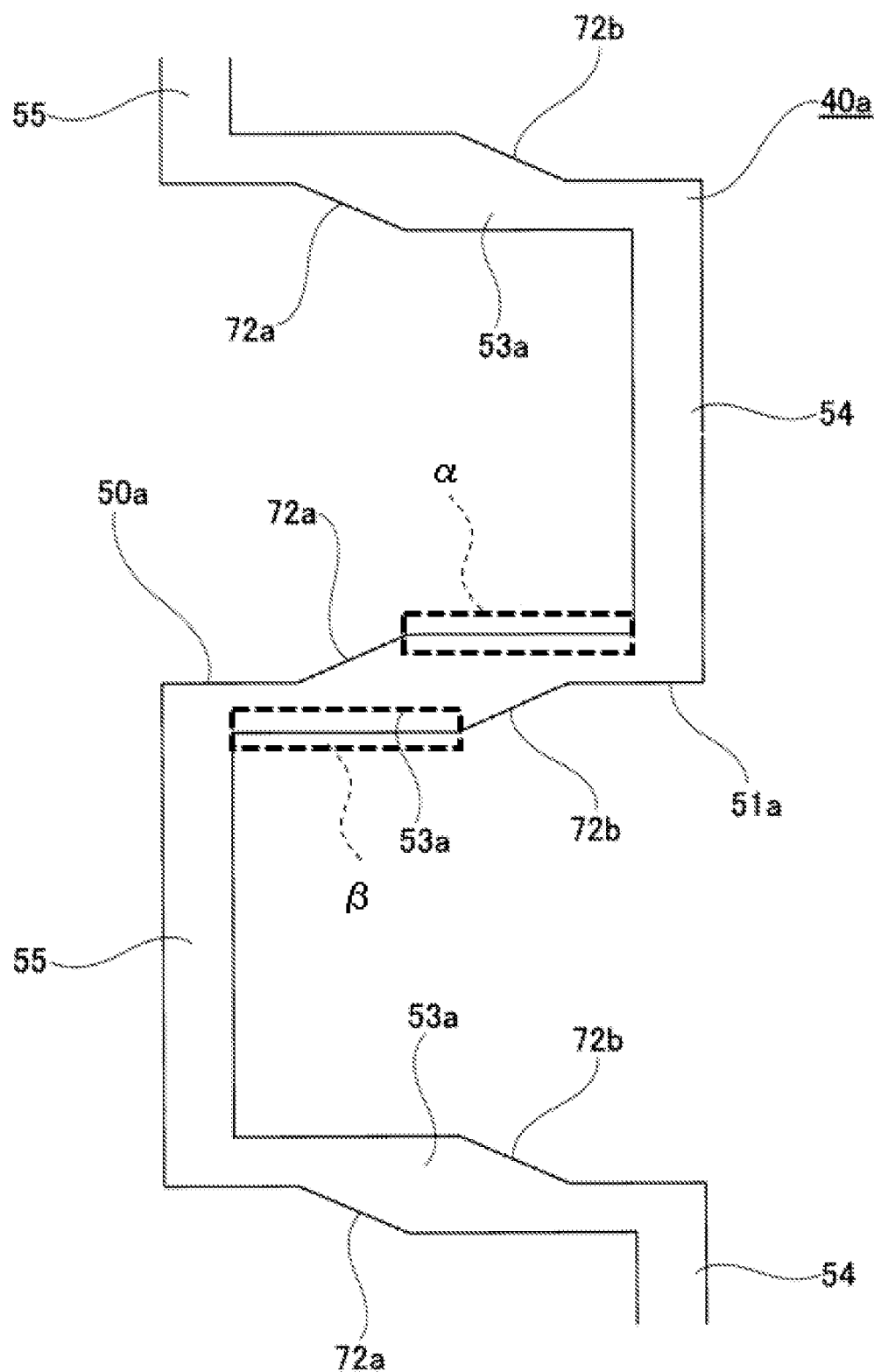
FIG. 15 is a view corresponding to FIG. 13, illustrating a modification example of the example of the embodiment.

A modification example of the example according to the embodiment of the present invention will be described with reference to FIG. 15. In this modification example, each of first recess portions 50a has a larger circumferential width dimension between axial other side portions of inner surfaces facing each other in the circumferential direction than a circumferential width dimension between axial one side portions, and each of the second recess portions 51a has a larger circumferential width dimension between axial one side portions of inner surfaces facing each other in the circumferential direction than a circumferential width dimension between axial other side portions.

Specifically, stepped portions 72a are formed at axially intermediate portions of the circumferential inner surfaces (circumferential side surfaces, facing each other, of a pair of arm portions 53a with axial one side ends connected to the first side plate portion 54) on both sides of the first recess portion 50a so as to be inclined in a direction away from each other as the stepped portions 72a extend toward the axial other side. As a result, the circumferential width dimension between the axial other side portions of the inner surfaces of the first recess portion 50a is made larger than the circumferential width dimension between the axial one side portions. In addition, stepped portions 72b are formed in a part of the axially intermediate portions of the circumferential inner surfaces (circumferential side surfaces, facing each other, of a pair of arm portions 53a with axial other side ends connected to the second side plate portion 55) on both sides of the second recess portion 51a, which is the portion located further on the axial one side than the stepped portion 72a, so as to be inclined in a direction away from each other as the stepped portions 72b extend toward the axial one side. The circumferential width dimension between the axial one side portions of the inner surfaces of the second recess portion 51 is made larger than the circumferential width dimension between the axial other side portions.

When transmitting a large torque between the output shaft 14 and the worm 17, an axial one side portion (a portion surrounded by the chain line α in FIG. 15) of the circumferential inner surface of the first recess portion 50a abuts on the circumferential outer surface of the first convex portion 43, and the axial other side portion (a portion surrounded by the chain line β in FIG. 15) of the circumferential inner surface of the second recess portion 51a abuts on the circumferential outer surface of the second convex portion 47. As is clear from FIG. 15, an axial other side end of the abutment portion between the circumferential inner surface of the first recess portion 50a and the circumferential outer surface of the first convex portion 43 and an axial one side end of the abutment portion between the circumferential inner surface of the second recess portion 51a and the circumferential outer surface of the second convex portion 47 overlap in the circumferential direction. Therefore, torque can be stably transmitted between the output shaft 14 and the worm 17 via the torque transmission joint 13.

Further, according to this modification example, even when the coupling 40a is tilted with respect to the central axis of the worm 17 and/or the central axis of the output shaft 14, or is displaced relative to the axial direction, the abutment position of the circumferential inner surface of the first recess portion 50a with respect to the circumferential outer surface of the first convex portion 43 can be set to be close to the axial center position of the coupling 40a, and the abutment position of the circumferential inner surface of the second recess portion 51a with respect to the circumferential outer surface of the second convex portion 47 can be set to be close to the axial center position of the coupling 40a. That is, when the coupling 40a is tilted with respect to the central axis of the worm 17 and/or the central axis of the output shaft 14, the coupling 40a can be tilted about the vicinity of the axial center position. From this aspect as well, torque can be stably transmitted between the output shaft 14 and the worm 17 via the torque transmission joint 13.

When carrying out this modification example, the circumferential width dimension of the axial other side portions of the inner surfaces facing each other in the circumferential direction of the first recess portion can be made constant over the axial direction and made larger than the circumferential width dimension of the axial one side portions, and the circumferential width dimension of the axial one side portions of the inner surfaces facing each other in the circumferential direction of the second recess portion can be made constant over the axial direction and made larger than the circumferential width dimension of the axial other side portions.

The worm reducer-attached electric motor of the present invention is not limited to the column assist type electric power steering device, and can be incorporated into electric power steering devices having various structures.

Figure 16:
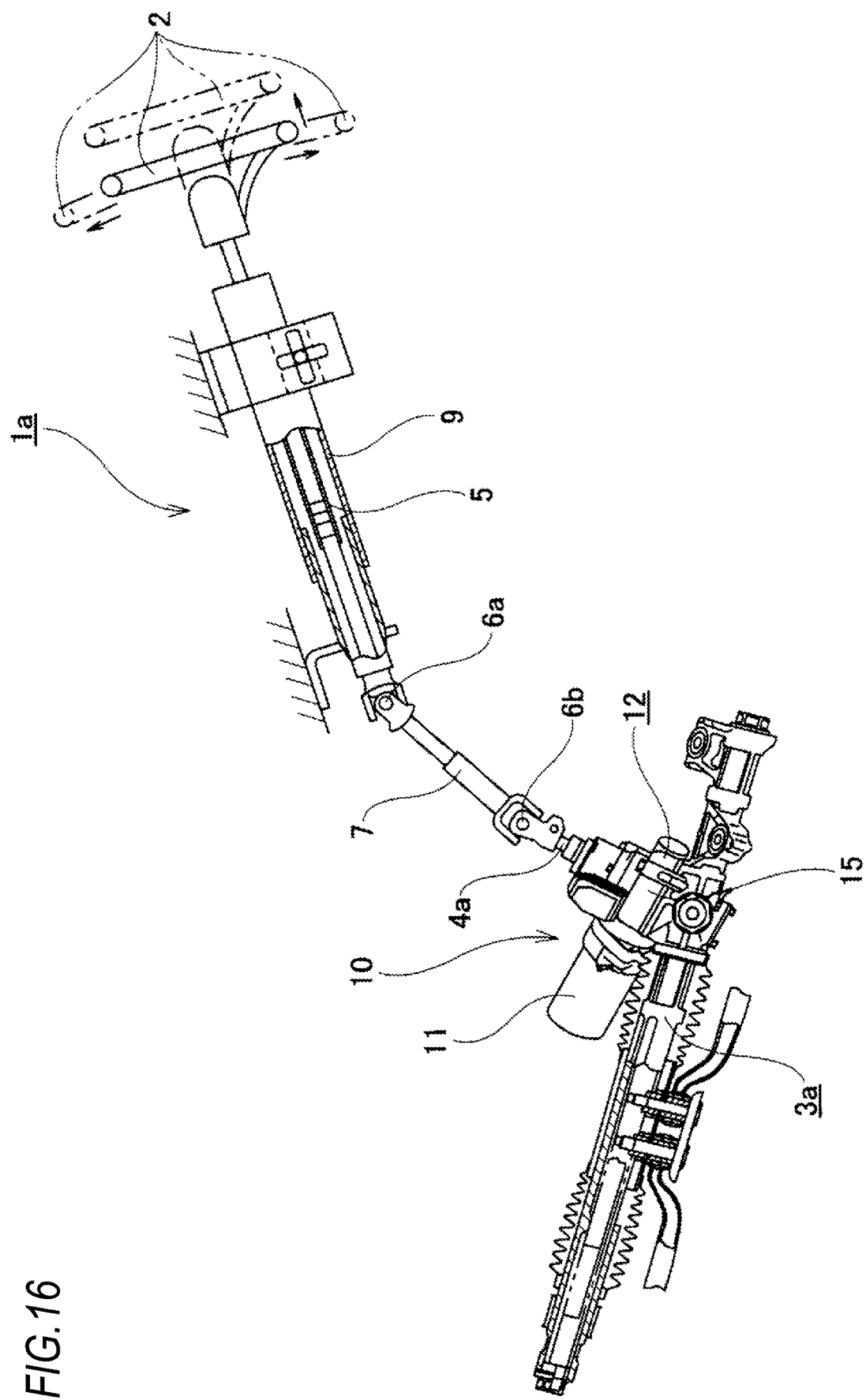
FIG. 16 is a partially cut side view illustrating a pinion assist type electric power steering device in which the worm reducer-attached electric motor of the present invention can be incorporated.

Specifically, for example, when the worm reducer-attached electric motor of the present invention is incorporated into a pinion assist type electric power steering device 1a as illustrated in FIG. 16, the worm wheel 16 of the worm reducer 12 is supported and fixed to the input shaft 4a of the steering gear unit 3a.

Figure 17:
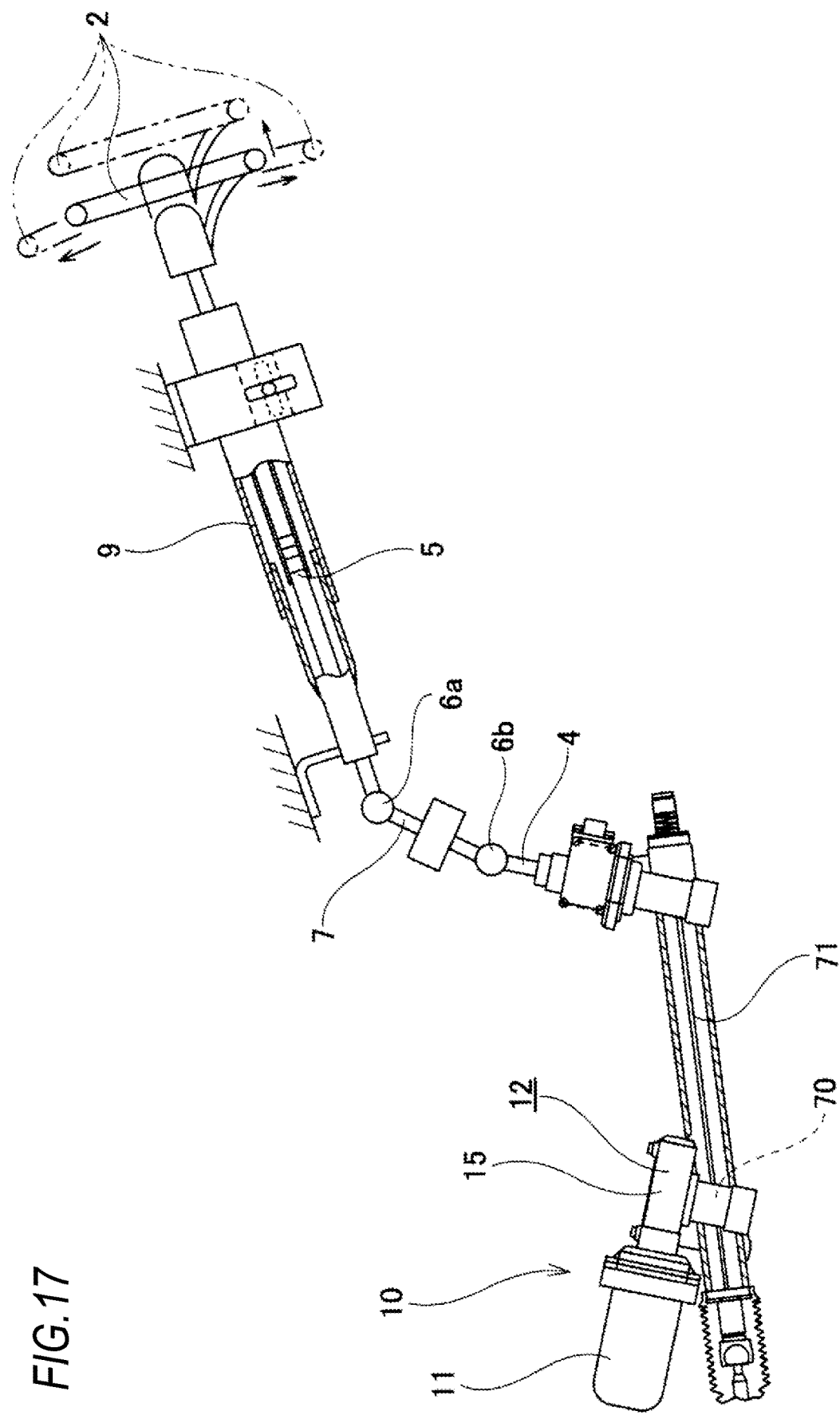
FIG. 17 is a partially cut side view illustrating a double pinion type electric power steering device in which the worm reducer-attached electric motor of the present invention can be incorporated.

When the worm reducer-attached electric motor of the present invention is incorporated into a double pinion type electric power steering device 1b as illustrated in FIG. 17, a rotation shaft 70 to which the worm wheel 16 is fitted and fixed is placed at a portion of the steering gear unit 3 that is deviated from the input shaft 4 in a width direction of a vehicle, and pinion tooth provided at a tip portion of the rotation shaft 70 are engaged with tooth portion of a rack 71 forming the steering gear unit 3.

Further, the worm reducer-attached electric motor of the present invention can be incorporated not only in the electric power steering device but also in various mechanical devices. Further, the torque transmission joint of the present invention is not limited to the worm reducer-attached electric motor, and can be used by being incorporated between a pair of rotating shafts arranged coaxially with each other in a torque transmission path of various mechanical devices.

This application is based on a Japanese Patent Application No. 2019-219337 filed on Dec. 4, 2019, the contents of which are incorporated herein by reference.

REFERENCE SIGNS LIST 1, 1a, 1b: electric power steering device
2: steering wheel
3, 3a: steering gear unit
4, 4a: input shaft
5: steering shaft
6a, 6b: universal joint
7: intermediate shaft
8: tie rod
9: steering column
10: worm reducer-attached electric motor
11: electric motor
12: worm reducer
13: torque transmission joint
14: output shaft
15: housing
16: worm wheel
17: worm
18: wheel accommodation portion
19: worm accommodation portion
20: lid body
21: cylindrical surface portion
22: step portion
23: guide holding portion
24: wheel tooth
25: inner wheel element
26: outer wheel element
27: worm tooth
28: fitting cylinder portion
29: ball bearing
30: flange portion
31: first rotating member
32: elastic member
33: small diameter cylinder portion
34: support bearing
35: guide member
36: locking groove
37: elastic ring
38: leaf spring
39: second rotating member
40: coupling
41: first elastic body
42: second elastic body
43: first convex portion
44: base portion
45: flange portion
46: protruding portion
47: second convex portion
48: base portion
49: protruding portion
50, 50a: first recess portion
51, 51a: second recess portion
52: boss portion
53, 53a: arm portion
54: first side plate portion
55: second side plate portion
56: first support portion
57: second support portion
58: first locking groove
59: second locking groove
60: first elastic piece
61: first inner diameter side connection piece
62: first outer diameter side connection piece
63: first locking piece
64: first protrusion
65: second elastic piece
66: second inner diameter side connection piece
67: second outer diameter side connection piece
68: second locking piece
69: second protrusion
70: rotation shaft
71: rack
72a, 72b: stepped portion
73: first supported portion
74: second supported portion

The invention claimed is:

1. A torque transmission joint, comprising:
a first rotating member having first convex portions protruding toward axial one side at a plurality of locations in a circumferential direction on an axial one side surface;
a second rotating member having second convex portions protruding toward axial other side at a plurality of locations in the circumferential direction on an axial other side surface;
a coupling having first recess portions which are opened at least on the axial other side surface and with which the first convex portions are respectively engaged to allow relative displacement in the circumferential direction at a plurality of locations in the circumferential direction and second recess portions which are opened at least on the axial one side surface and with which the second convex portions are respectively engaged to allow relative displacement in the circumferential direction at a plurality of locations in the circumferential direction which deviate from the first recess portions in the circumferential direction;

a first elastic body having a plurality of first elastic pieces pinched in the circumferential direction between the respective first convex portions and the coupling; and a second elastic body having a plurality of second elastic pieces pinched in the circumferential direction between the respective second convex portions and the coupling, wherein:

the coupling includes:

a boss portion having a cylindrical or columnar shape;

a plurality of arm portions protruding outward in a radial direction from a plurality of circumferential locations on an outer peripheral surface of the boss portion;

a plurality of first side plate portions which protrude outward in the radial direction from a plurality of circumferential locations on an outer peripheral surface of an axial one side end of the boss portion and connect axial one side ends of a pair of the arm portions adjacent in the circumferential direction in the circumferential direction; and a plurality of second side plate portions which protrude outward in the radial direction from a plurality of circumferential locations deviating from the first side plate portions in the circumferential direction of an outer peripheral surface of an axial other side end of the boss portion and connect axial other side ends of a pair of the arm portions adjacent in the circumferential direction in the circumferential direction;

each of the first recess portions is defined by an outer peripheral surface of the boss portion, an axial other side surface of each of the first side plate portions, and circumferential side surfaces of a pair of the arm portions facing each other with axial one side ends connected to each of the first side plate portions; and each of the second recess portions is defined by the outer peripheral surface of the boss portion, an axial one side surface of each of the second side plate portions, and circumferential side surfaces of a pair of the arm portions facing each other with axial other side ends connected to each of the second side plate portions.

2. The torque transmission joint according to claim 1, wherein the coupling has a first support portion for supporting the first elastic body on an axial other side surface of each of the second side plate portions and has a second support portion for supporting the second elastic body on an axial one side surface of each of the first side plate portions.

3. The torque transmission joint according to claim 2, wherein:

the first elastic body further includes a plurality of first inner diameter side connection pieces and a plurality of first outer diameter side connection pieces which are arranged alternately in the circumferential direction, and first locking pieces;

the first inner diameter side connection piece connects radial inner ends of a pair of the first elastic pieces adjacent in the circumferential direction;

the first outer diameter side connection piece connects radial outer ends of a pair of the first elastic pieces adjacent in the circumferential direction;

the first locking piece connects radial outer ends of a pair of the first elastic pieces with the radial inner ends connected by the first inner diameter side connection piece;

the first elastic body is supported by the coupling by fitting a first supported portion formed of a pair of the first elastic pieces adjacent in the circumferential direction, the first inner diameter side connection piece, and the first locking piece onto the first support portion;

the second elastic body further includes a plurality of second inner diameter side connection pieces and a plurality of second outer diameter side connection pieces which are arranged alternately in the circumferential direction, and second locking pieces;

the second inner diameter side connection piece connects radial inner ends of a pair of the second elastic pieces adjacent in the circumferential direction;

the second outer diameter side connection piece connects radial outer ends of a pair of the second elastic pieces adjacent in the circumferential direction;

the second locking piece connects radial outer connection portions of a pair of the second elastic pieces with the radial inner ends connected by the second inner diameter side connection piece; and the second elastic body is supported by the coupling by fitting a second supported portion formed of a pair of the second elastic pieces adjacent in the circumferential direction, the second inner diameter side connection piece, and the second locking piece onto the second support portion.

4. The torque transmission joint according to claim 3, wherein the coupling has a first locking groove extending circumferentially on a radial outer surface of the first support portion to lock the first locking piece, and has a second locking groove extending circumferentially on a radial outer surface of the second support portion to lock the second locking piece.

5. The torque transmission joint according to claim 1, wherein:

the first recess portion has a larger circumferential width dimension between axial other side portions of inner surfaces facing each other in the circumferential direction than a circumferential width dimension between axial one side portions; and the second recess portion has a larger circumferential width dimension between axial one side portions of inner surfaces facing each other in the circumferential direction than a circumferential width dimension between axial other side portions.

6. The torque transmission joint according to claim 5, wherein in a state where the first elastic piece is elastically crushed in the circumferential direction and a circumferential inner surface of the first recess portion abuts on a circumferential outer surface of the first convex portion, and the second elastic piece is elastically crushed in the circumferential direction and a circumferential inner surface of the second recess portion abuts on a circumferential outer surface of the second convex portion, an axial other side portion of a portion abutting on a circumferential outer surface of the first convex portion of a circumferential inner surface of the first recess portion and an axial one side portion of a portion abutting on a circumferential outer surface of the second convex portion of a circumferential inner surface of the second recess portion overlap in the circumferential direction.

7. The torque transmission joint according to claim 1, wherein:

the first elastic body has a plurality of first protrusions protruding toward the axial other side on an axial other side surface; and the second elastic body has a plurality of second protrusions protruding toward the axial one side on an axial one side surface.

8. The torque transmission joint according to claim 1, wherein:
   when the coupling is not tilted with respect to the axial direction, the plurality of first protrusions are not brought into contact with an axial one side surface of the first rotating member and the plurality of second protrusions are not brought into contact with an axial other side surface of the second rotating member; and
   when the coupling is tilted with respect to the axial direction, the plurality of first protrusions are brought into contact with the axial one side surface of the first rotating member and the plurality of second protrusions are brought into contact with the axial other side surface of the second rotating member.

9. The torque transmission joint according to claim 1, wherein the first elastic body and the second elastic body have the same shape and dimensions, and are made of the same material.

10. A worm reducer-attached electric motor, comprising:
    an electric motor which has an output shaft;
    a worm reducer which includes a worm wheel having a wheel tooth on an outer peripheral surface and a worm having a worm tooth which meshes with the wheel tooth on an outer peripheral surface; and
    a torque transmission joint which connects the output shaft and the worm so as to allow torque transmission, wherein:
    the torque transmission joint is composed of the torque transmission joint according to claim 1;
    the first rotating member is composed of the worm or is supported and fixed to the worm; and
    the second rotating member is composed of the output shaft or is supported and fixed to the output shaft.

* * * * *